Inventors
MILLARD ROMAINE
WALTER D. ARCHEA
By AHKParsons
Attorney

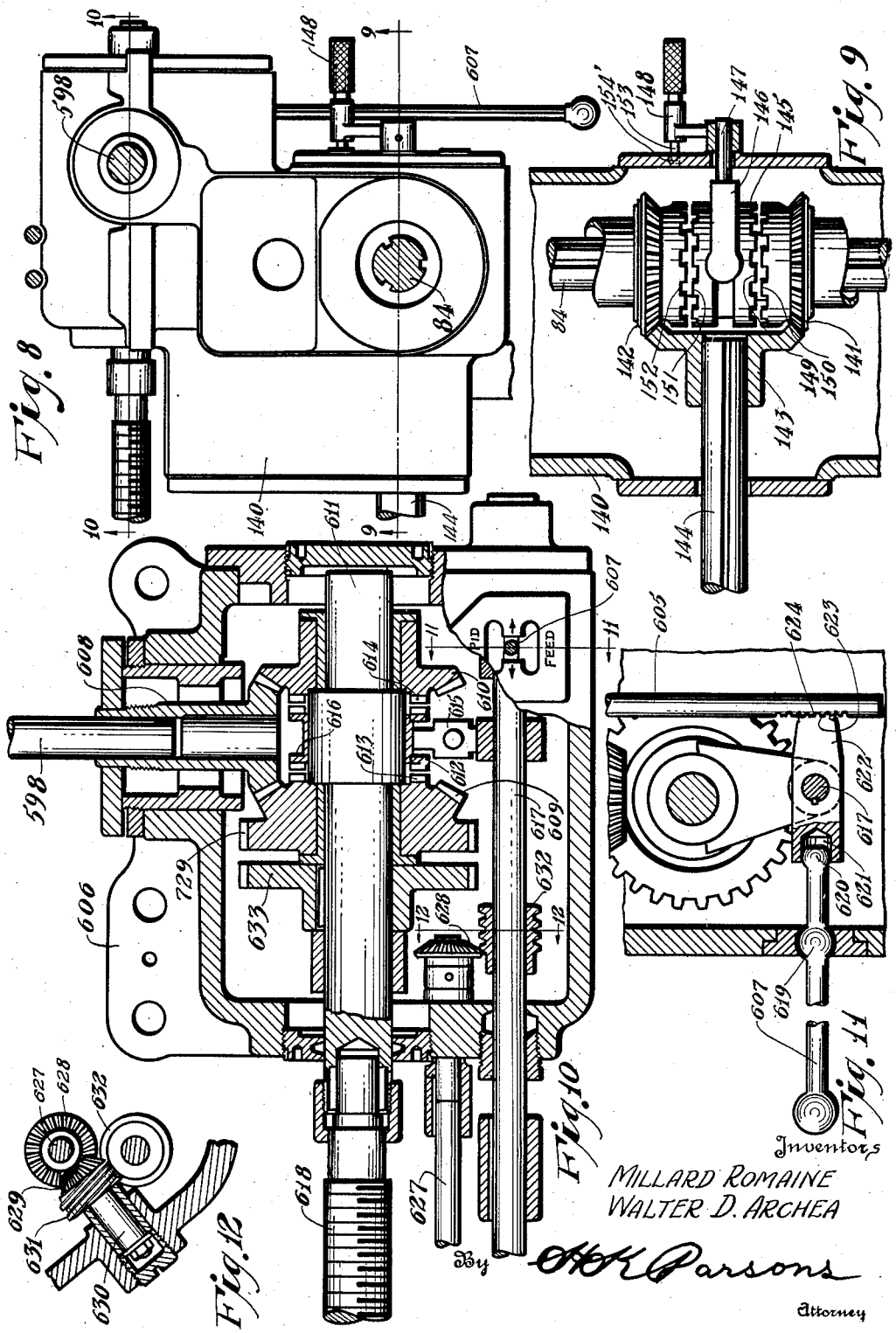

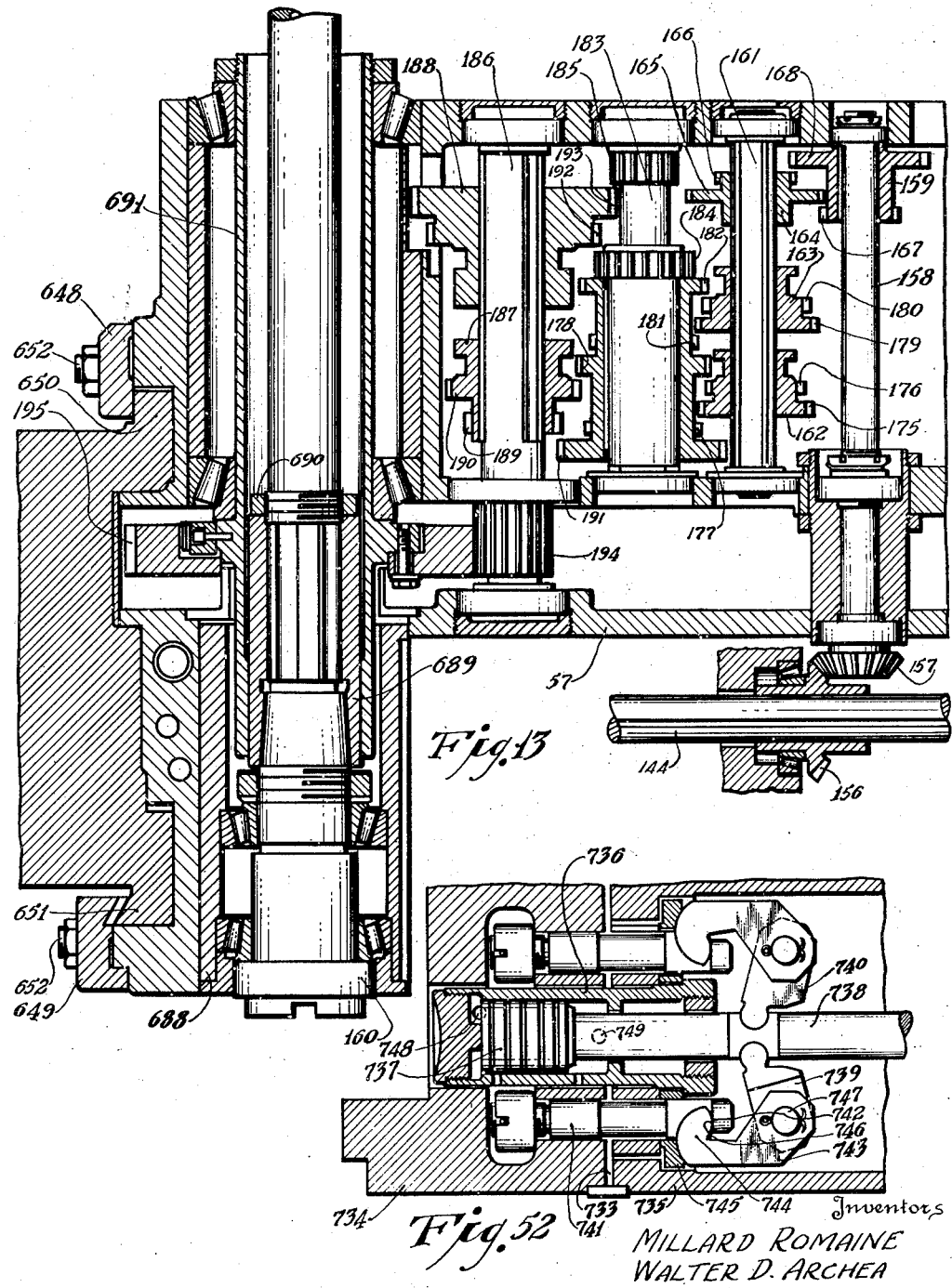

Oct. 23, 1934.　　　M. ROMAINE ET AL　　　1,978,374
MILLING MACHINE
Filed Jan. 2, 1932　　　22 Sheets-Sheet 9
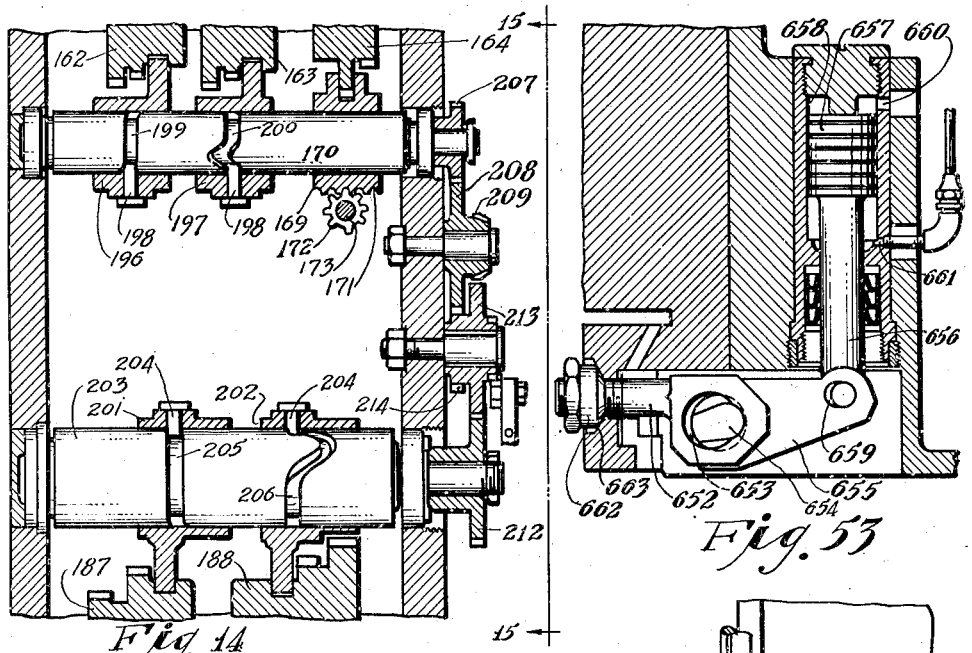
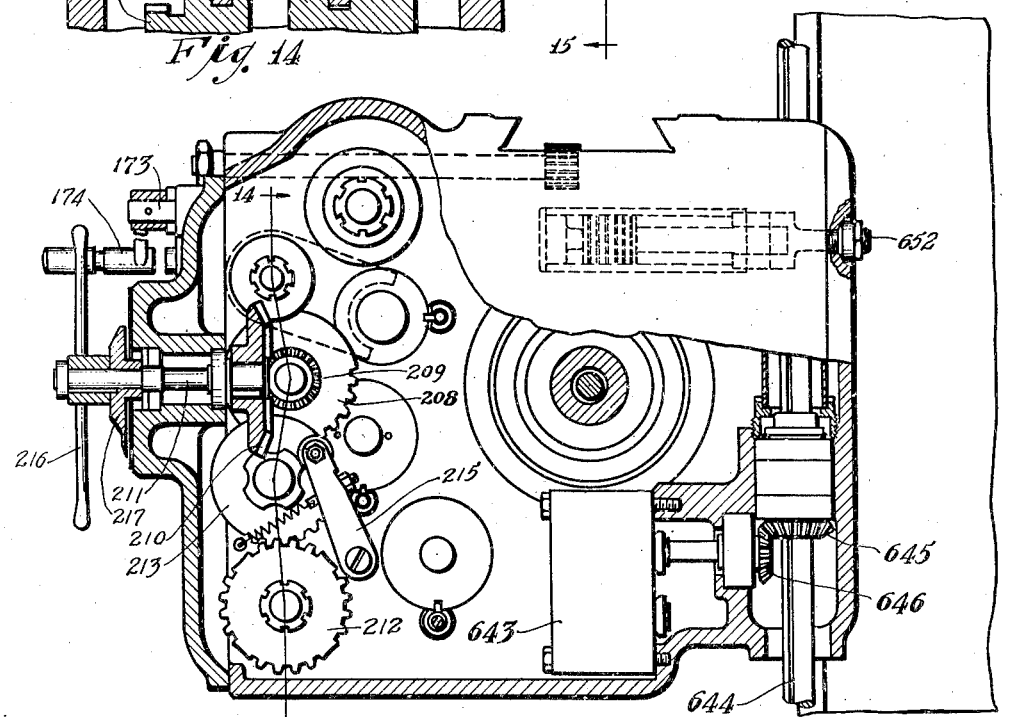
Inventors
MILLARD ROMAINE
WALTER D. ARCHEA
By AHKParsons
Attorney Oct. 23, 1934.  M. ROMAINE ET AL  1,978,374
MILLING MACHINE
Filed Jan. 2, 1932   22 Sheets-Sheet 10
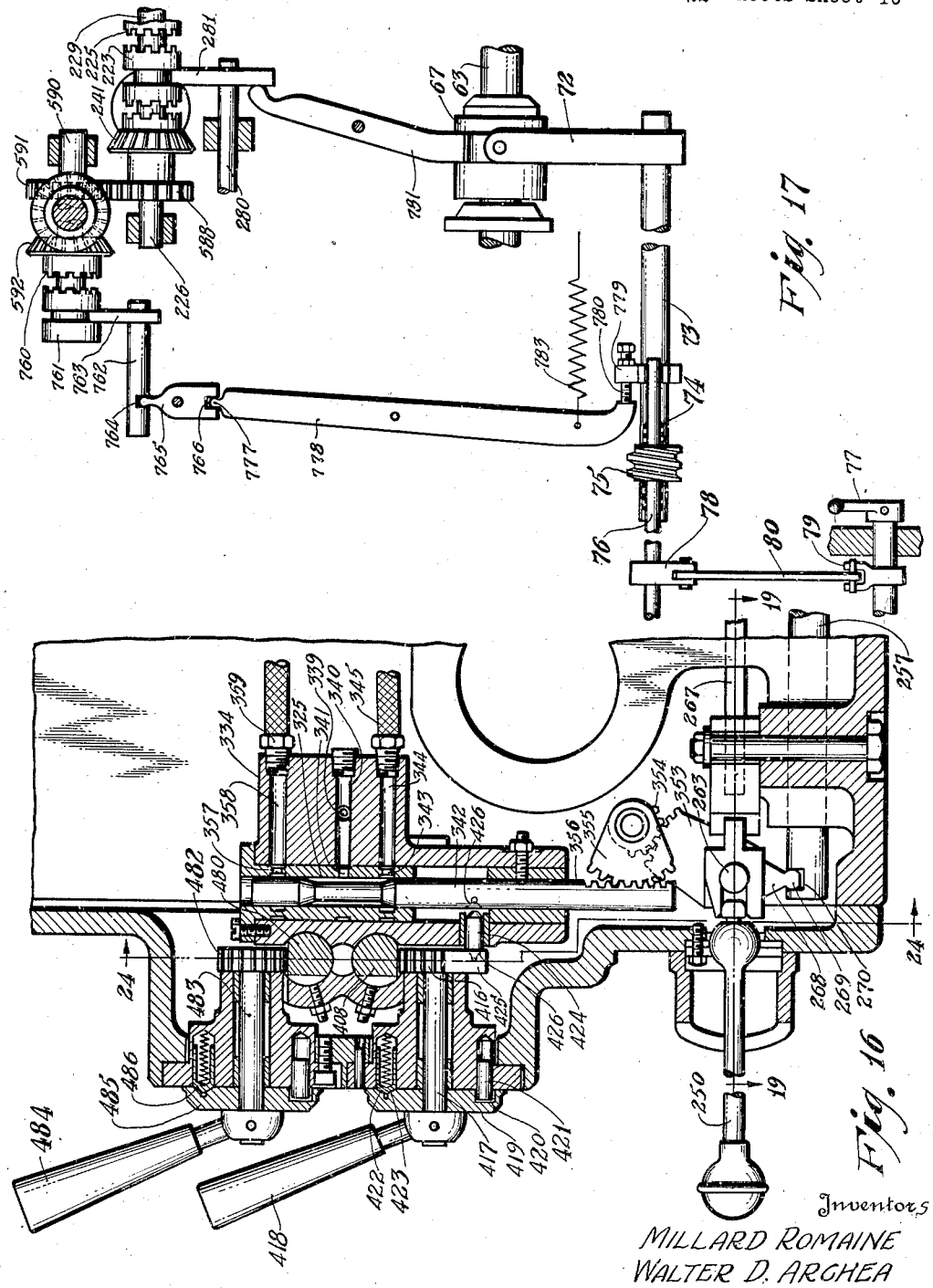
Inventors
MILLARD ROMAINE
WALTER D. ARCHEA
By 
Attorney

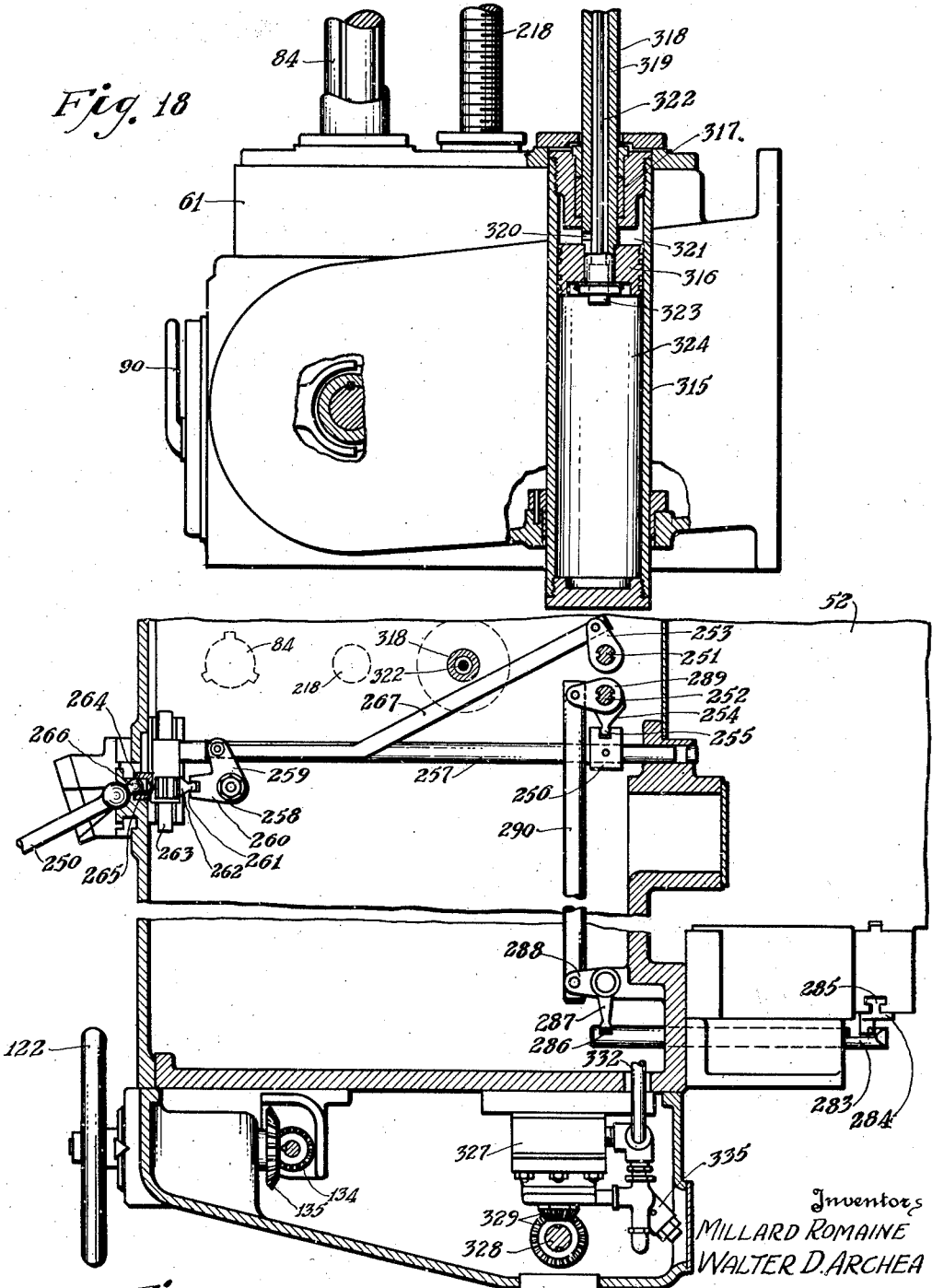

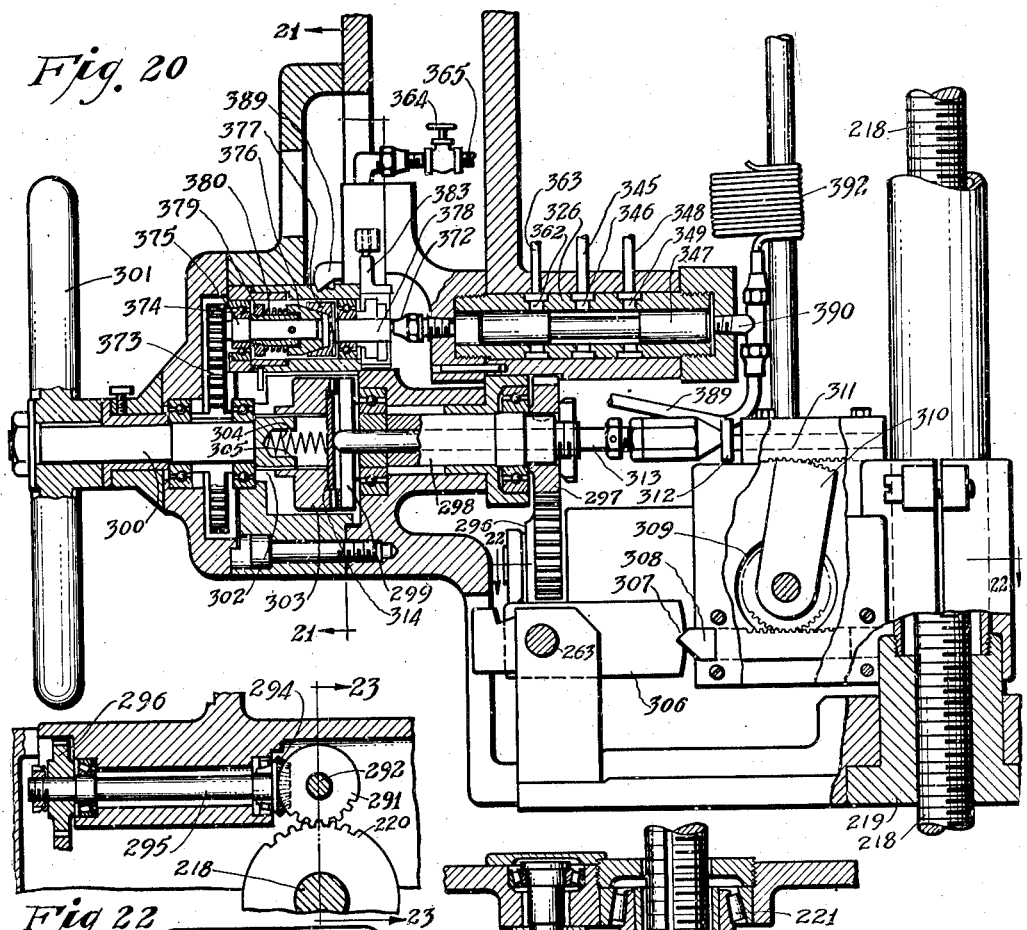
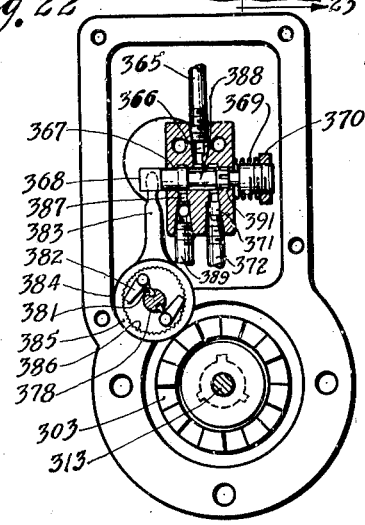
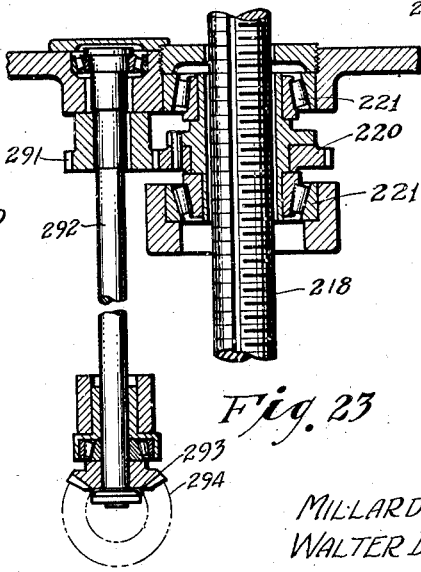

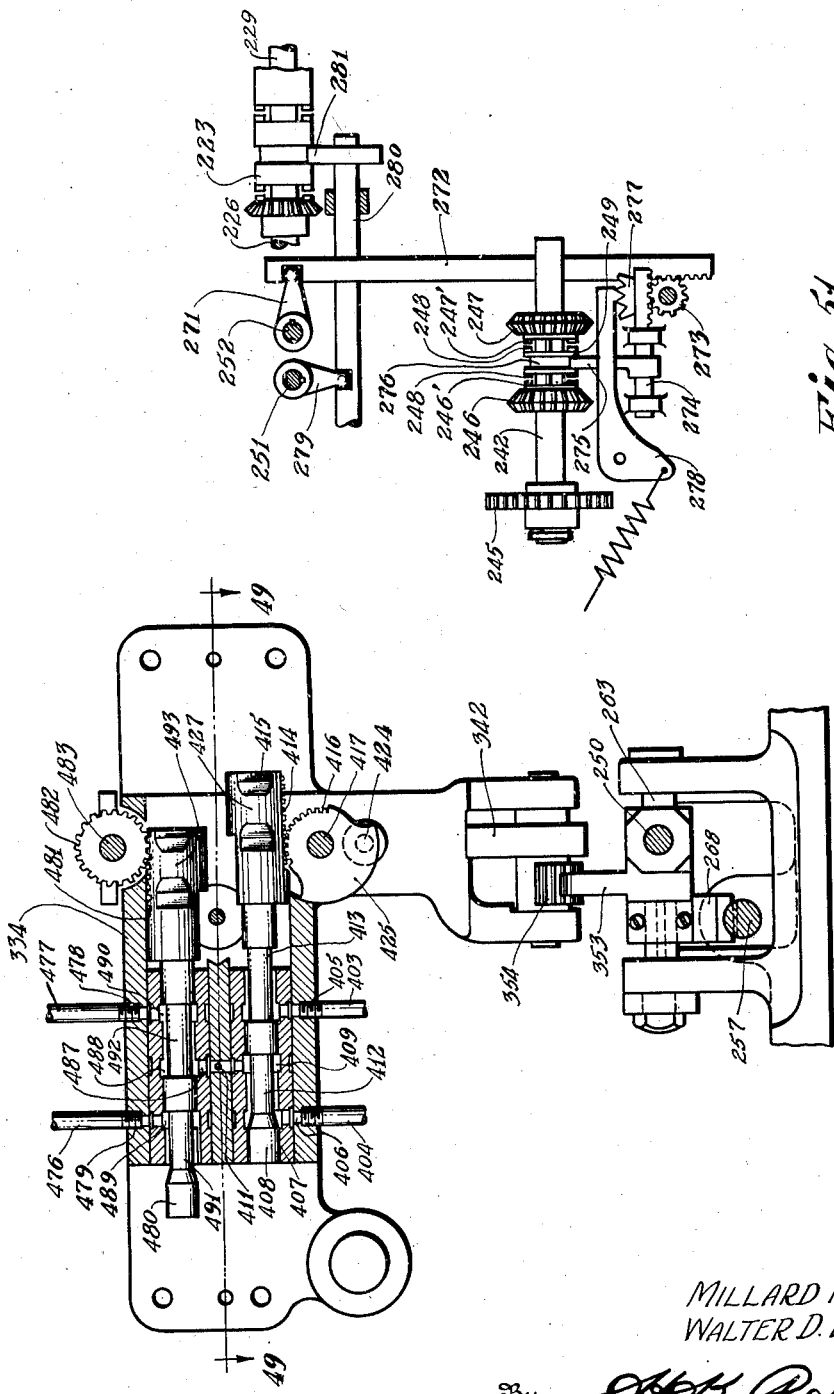

Inventors
MILLARD ROMAINE
WALTER D. ARCHEA

By  HK Parsons
Attorney

Oct. 23, 1934.  M. ROMAINE ET AL  1,978,374
MILLING MACHINE
Filed Jan. 2, 1932    22 Sheets-Sheet 15

Inventors
MILLARD ROMAINE
WALTER D. ARCHEA
By A.H.K. Parsons
Attorney

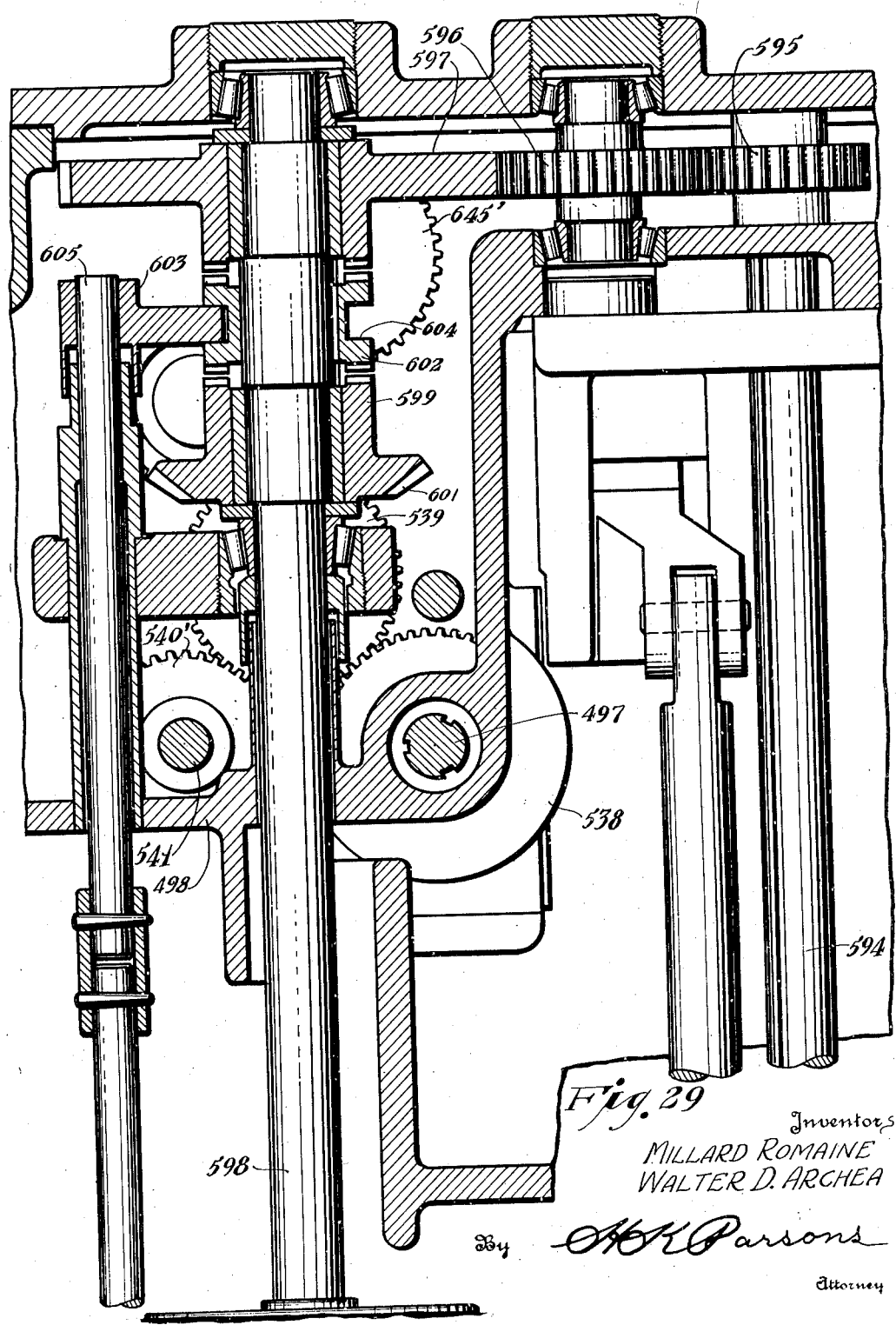

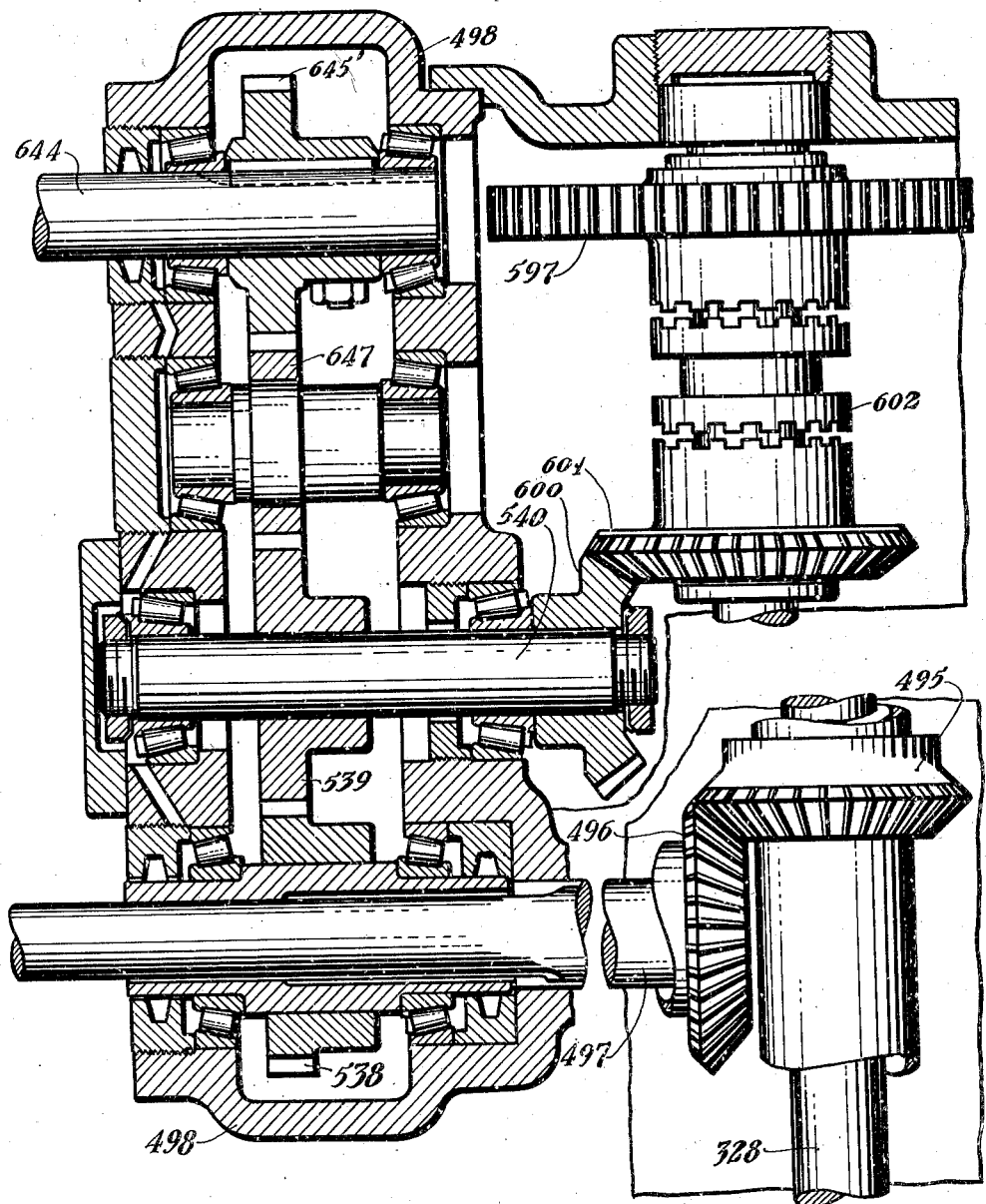

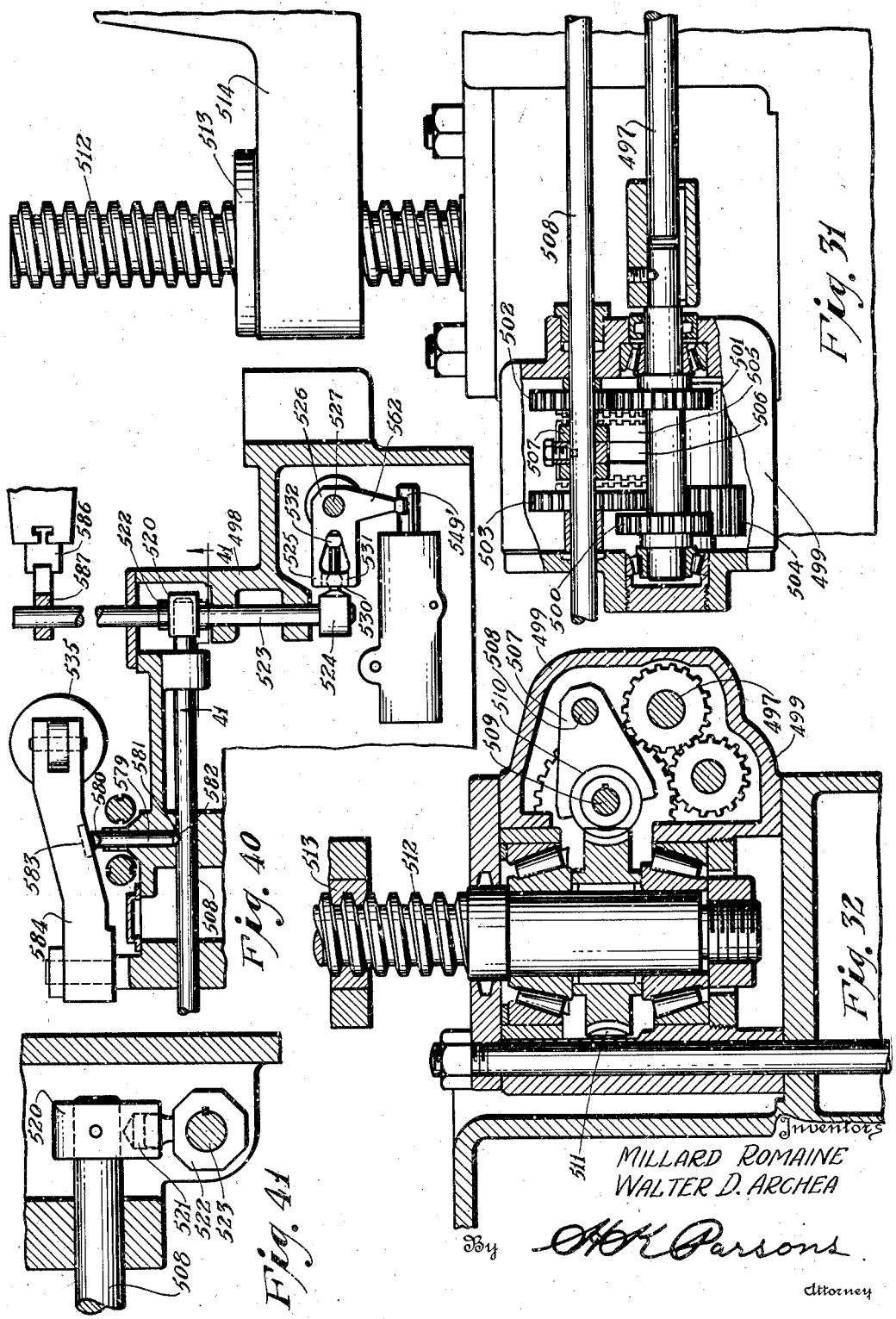

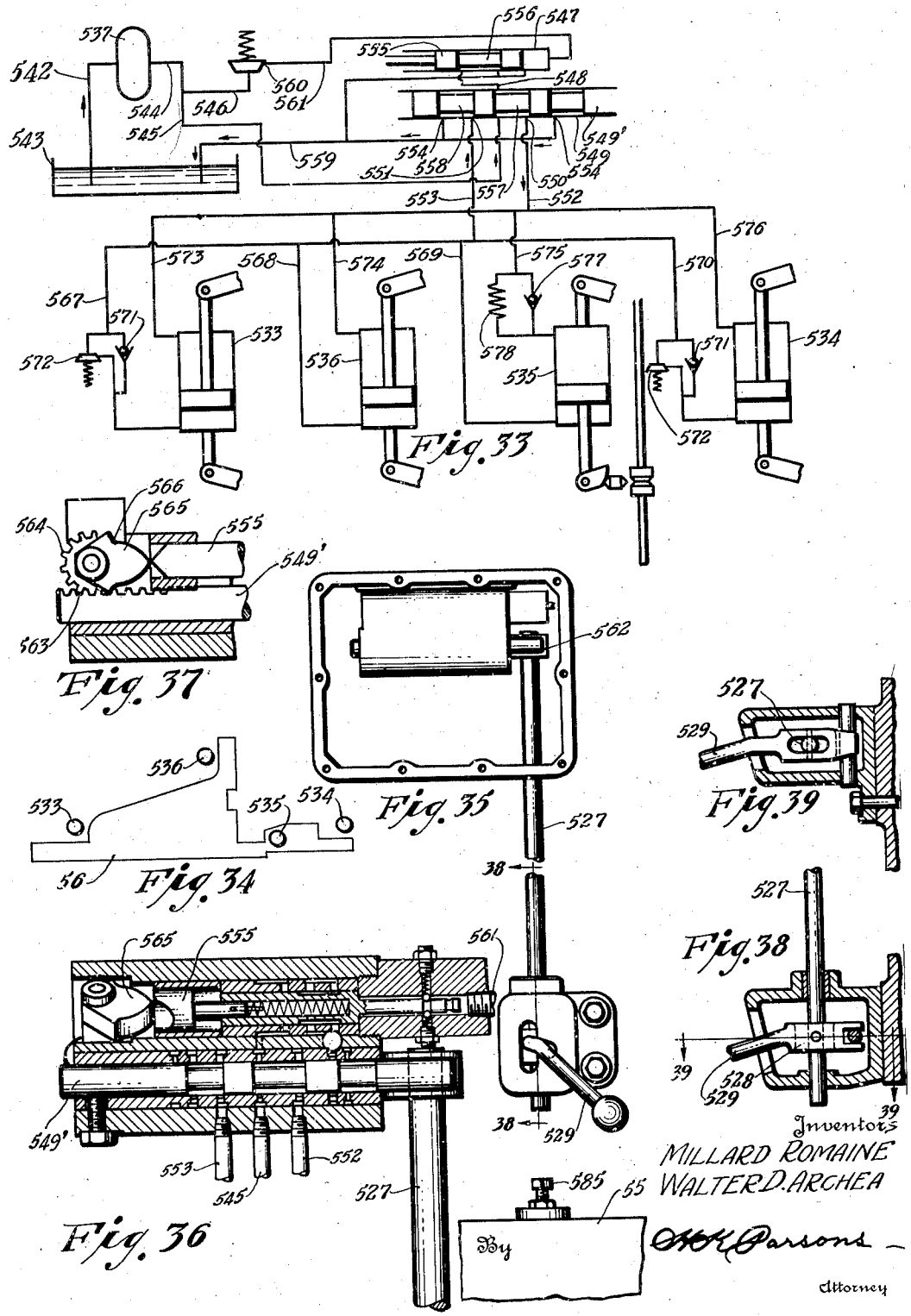

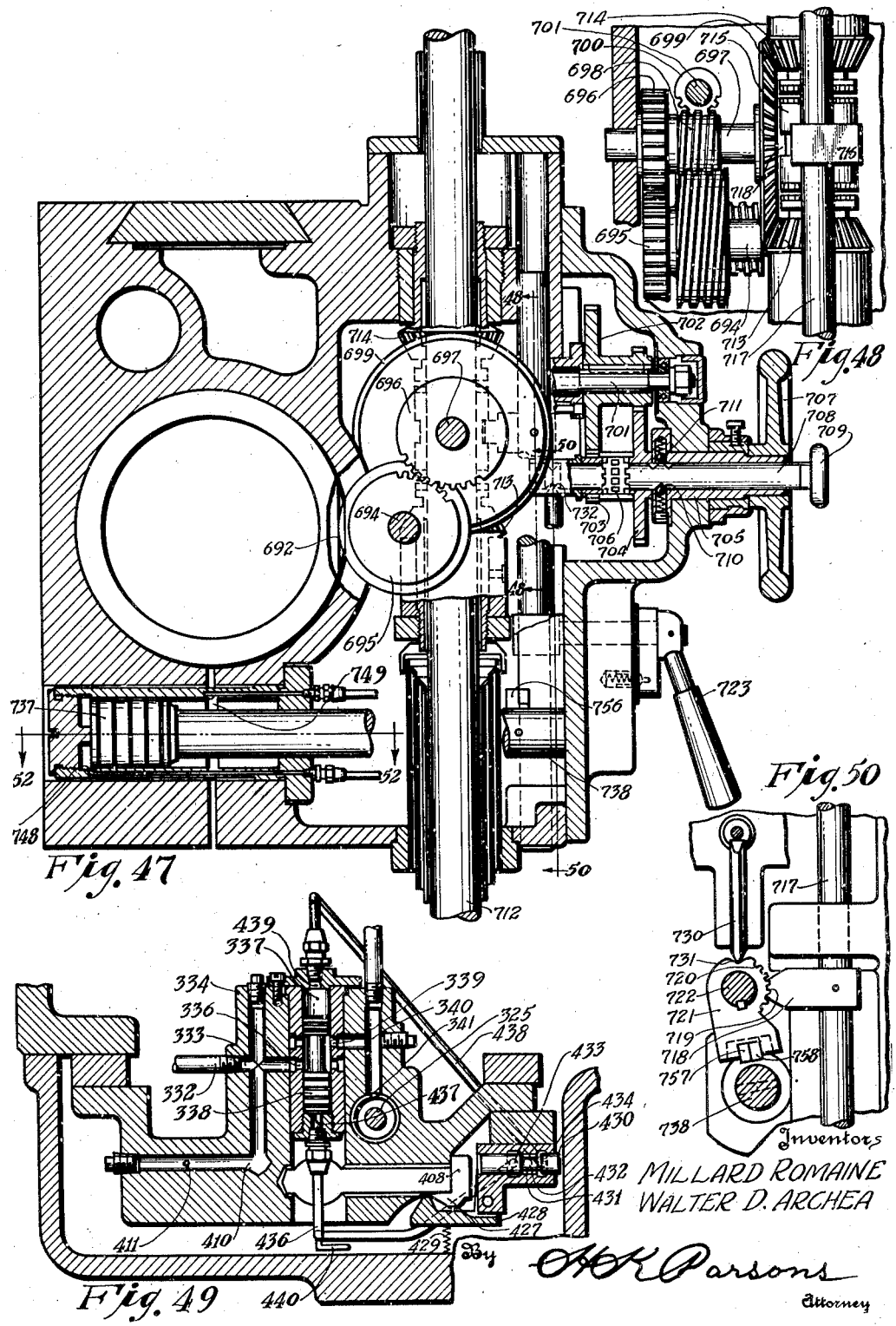

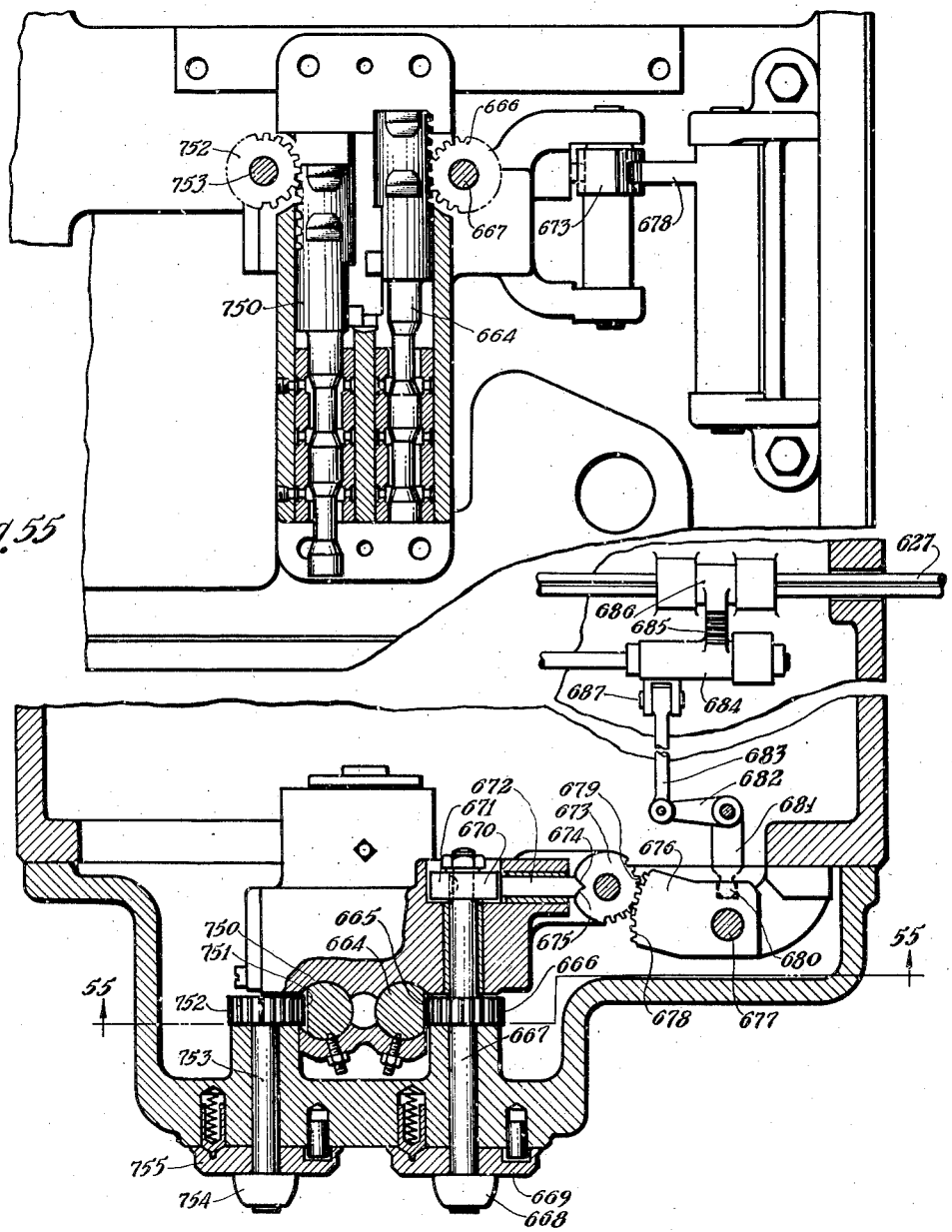

Patented Oct. 23, 1934

1,978,374

UNITED STATES PATENT OFFICE 1,978,374

MILLING MACHINE

Millard Romaine and Walter D. Archea, Cincinnati, Ohio, assignors to The Cincinnati Milling Machine Company, Cincinnati, Ohio, a corporation of Ohio Application January 2, 1932, Serial No. 584,360

44 Claims. (Cl. 90—16)

This invention relates to machine tools and more particularly to a new and improved milling machine of the planer type.

The trend of modern production methods is toward the accomplishment of as many tooling operations as possible in one set-up of a given work piece. Such methods are desirable because conducive to greater accuracy in the parallelism or angular relationship of the various finished surfaces. If the work piece is large, however, this becomes more difficult because of the physical limitations in the size of the machine in which the work is to be finished. On the other hand, as the machine increases in size it becomes more difficult to set up and operate because the adjustable members are heavier, the clamping mechanism is stiffer, and since the transmission is more powerful, there is a greater possibility of damage to the machine in such cases as when a clamped support is inadvertently power actuated without unclamping the same.

It is, therefore, one of the principal objects of this invention to provide an improved milling machine which will have the capacity for multiple milling operations on a large scale, but which will be so constructed as to overcome the above objections, will be easy to set up and operate, and in which the various actuating and clamping mechanisms are so interlocked as to preclude the possibility of anything but orderly and safe manipulation of the machine.

Another object of this invention is to provide an improved transmission for a plurality of cutter spindles of a machine tool which will permit independent determination of the direction and rate of rotation of each spindle, as well as its actuation or non-actuation relative to the remaining spindles, and in which after these determinations have been made, all the spindles will be subject to the joint control of a single main clutch.

A further object of this invention is to provide an improved transmission for a plurality of spindle carriers of a machine tool which is susceptible to actuating the carriers at various feed rates, or at a rapid traverse rate, and in which each carrier is provided with an independent rate and direction control lever, together with power means for clamping the carrier in position after adjustment, and interlocking means between the power control lever and the power clamping means to safeguard against inadvertent power actuation of the carrier while in a clamped condition.

A still further object of this invention is to provide improved transmission and control means for a translatable cross rail of a machine tool together with improved power means for clamping the same after adjustment whereby it will always be positioned in the same location relative to and transverse of the work table and interlocking means to prevent power actuation of the rail while it is clamped to its support.

An additional object of this invention is to provide improved means between two movable members on a common guideway to automatically prevent collision between them upon movement of one toward the other.

Still another object of this invention is to provide an improved power transmission for the quill of a cutter spindle which may be actuated at feed or rapid traverse rates, together with power clamping means for the quill, and an interlock between the clamp and the power actuator which will eliminate the possibility of damage arising from an attempt to power move the quill while it is clamped.

Other objects include improved inter-locking means between the power transmission for the movable members and the power transmission for the spindles which is of such a nature as to insure cutter rotation when the members carrying the cutters are moving; the provision of dual control levers for various operating parts; independent hydraulic systems in each of the movable members for supplying power for auxiliary purposes in which the systems are so constructed as to operate normally at low pressures and automatically at high pressures when the necessity for the same arises; improved hydraulic counter-balancing means for vertically movable members and other auxiliary devices which will aid the operator in manipulating the machine with ease and convenience, and at the same time safeguard the machine against damage by eliminating the possibility of faulty manipulation on the part of the operator.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts.

Figure 8 is a plan view of the drive bracket carried by the horizontal rail.

Figure 9 is a section on the line 9—9 of Figure 8.

Figure 10 is a section on the line 10—10 of Figure 8.

Figure 11 is a section on the line 11—11 of Figure 10.

Figure 12 is a detail section on the line 12—12 of Figure 10.

Figure 13 is an expanded view of the speed change mechanism in the vertical spindle carrier.

Figure 14 is a detail view of the shifter cams for the variable speed transmission in the vertical spindle carrier.

Figure 15 is a section showing the control mechanism for the shifter cams of Figure 14.

Figure 16 is a vertical section on the line 16—16 of Figure 1 showing the carrier clamping and counterweight control valve, and interlocking mechanism between the valves and the carrier traversing control.

Figure 17 is a diagrammatic view of an interlock between the main spindle, the carrier feed and the rail feed control clutches.

Figure 18 is a vertical section through the counterweight cylinder.

Figure 19 is a horizontal section on the line 19—19 of Figure 16.

Figure 20 is a vertical section on the line 20—20 of Figure 1 showing the manual elevating mechanism for the horizontal spindle carrier.

Figure 21 is a section on the line 21—21 of Figure 20.

Figure 22 is a section on the line 22—22 of Figure 20.

Figure 23 is a vertical section on the line 23—23 of Figure 22.

Figure 24 is a vertical section on the line 24—24 of Figure 16.

Figure 29 is a section on the line 29—29 of Figure 1.

Figure 30 is an expanded view on the line 30—30 of Figure 29.

Figure 31 is an elevation partly in section of the cross rail elevating transmission.

Figure 32 is a detail view of the elevating screw mounting.

Figure 33 is a diagrammatic view of the control circuit for the hydraulically actuated clamps for the horizontal rail.

Figure 34 is a diagram showing the location of the rail clamps.

Figure 35 is a detail of the rail clamp control.

Figure 36 is a vertical section through the rail clamp control valve.

Figure 37 is a detail of the control cam in the rail clamp valve.

Figure 38 is a vertical section on the line 38—38 of Figure 35.

Figure 39 is a section on the line 39—39 of Figure 38.

Figure 40 is a plan view of the rail clamping control interlock and knockout.

Figure 41 is a section on the line 41—41 of Figure 40.

Figure 44 is a detail section on the line 44—44 of Figure 4.

Figure 45 is a detail view of one of the carrier clamping cylinders.

Figure 46 is a detail section on the line 46—46 of Figure 45.

Figure 47 is a sectional view of the quill reciprocating and clamping mechanism of the vertical spindle carrier.

Figure 48 is a detail section on the line 48—48 of Figure 47.

Figure 49 is a sectional view of the horizontal carrier valve assembly.

Figure 50 is a detail view of the interlock between the hand and power quill feed controls.

Figure 51 is a plan view of the control mechanism for the rate and direction control clutches for the elevating screw.

Figure 52 is a detail section through the vertical spindle carrier on line 52—52 of Figure 47 showing the quill clamping mechanism therefor.

Figure 53 is a detail section through the vertical spindle carrier showing the carrier clamping mechanism.

Figure 54 is a section through the vertical spindle carrier on the line 54—54 of Figure 1.

Figure 55 is a section on the line 55—55 of Figure 54.

Figure 1:
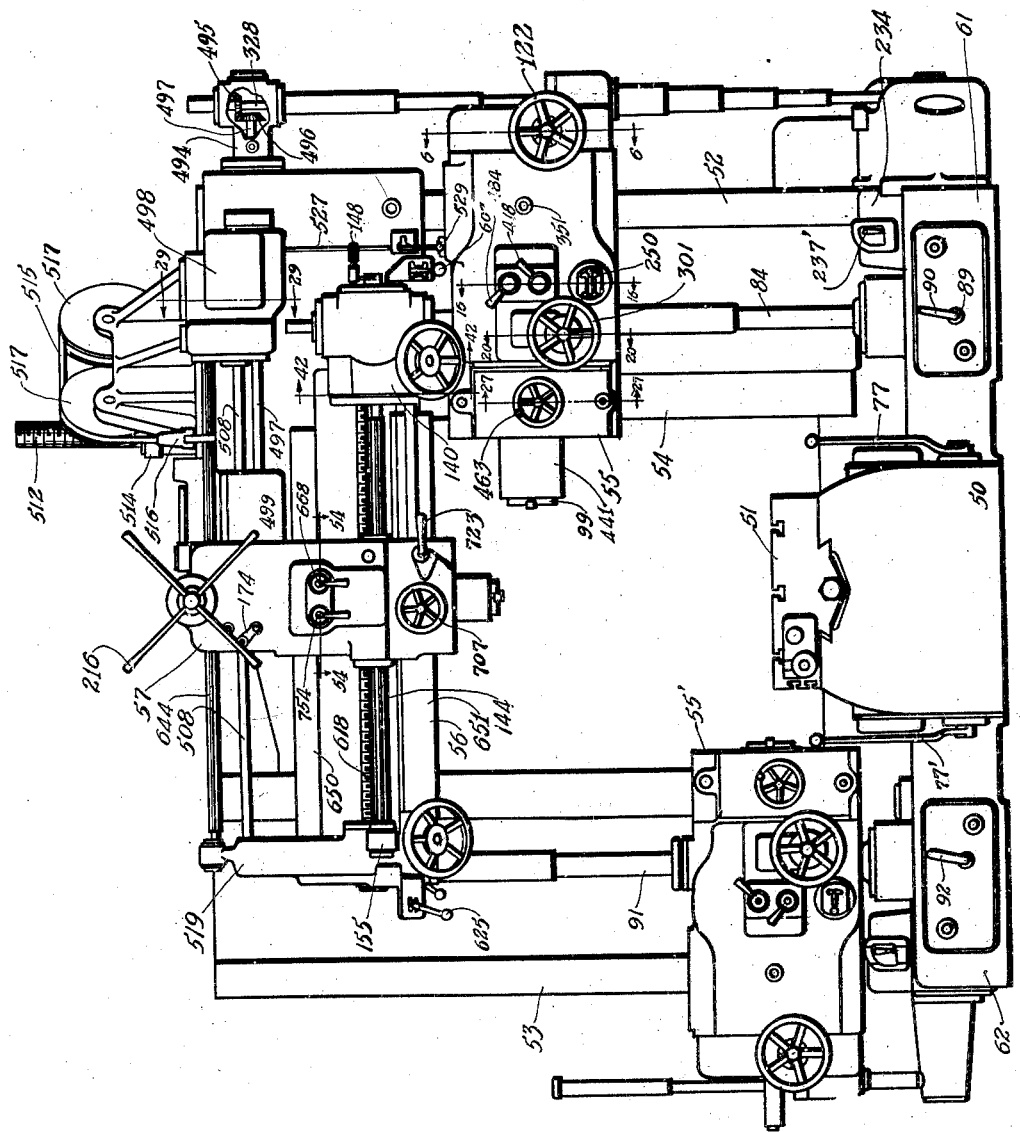
Figure 1 is a front elevation of a machine tool embodying the principles of this invention.

The machine in general comprises a power reciprocated work table in combination with a plurality of vertically adjustable horizontal spindle carriers and a vertical spindle carrier which is transversely adjustable on a vertically adjustable rail, the spindle carriers being adapted to rotate cutters for operation either individually or simultaneously on work carried by the table.

The reference numeral 50 indicates generally the bed of the machine upon which is reciprocably mounted the work support or table 51. This table is adapted to be reciprocated by hydraulic means comprising a self-contained independent hydraulic transmission and control system actuated by its own prime mover which may be similar to the hydraulic transmission shown in application Serial Number 220,751 filed September 15, 1927, but since the table transmission forms no part of the present invention it is not further illustrated herein. The table transmission is intended to be a separate entity and for that reason any suitable mechanical transmission may be utilized in place of the hydraulic transmission if so desired.

On opposite sides of the bed and integrally connected therewith, are two vertical columns which may be termed a headstock 52 and a tail-gears 114 and 115, shiftable selectively into mesh with gears 102 and 110 on the shaft 105. Also, slidably mounted on the shaft 112 is the shiftable gear 116 movable selectively into mesh with the gear 111. Thus the drive pinion 97 secured to the end of the shaft 112 and thereby the cutter spindle may be driven at nine different speeds. The gear couplet 113 is adapted to be moved by the shifter 117 while the gear 116 is adapted to be moved by the shifter 118.

Figure 6:
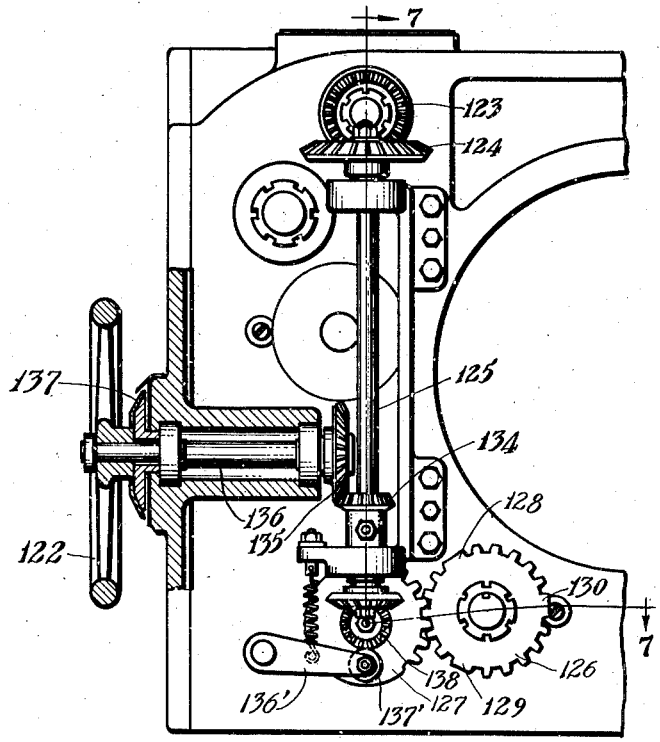
Figure 6 is a vertical section on the line 6—6 of Figure 1 showing the speed change control mechanism.
Figure 7:
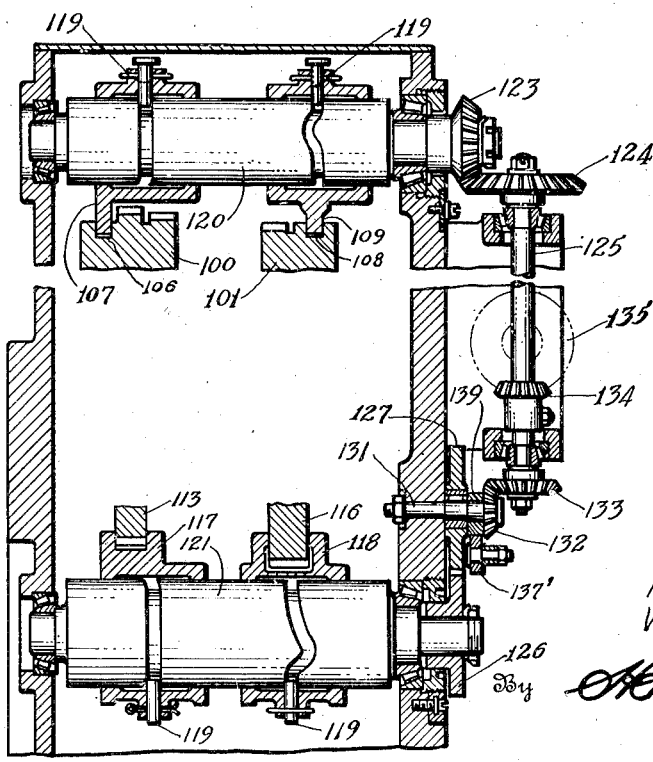
Figure 7 is a detail sectional view of the control cams of the speed change mechanism.
Figure 25:
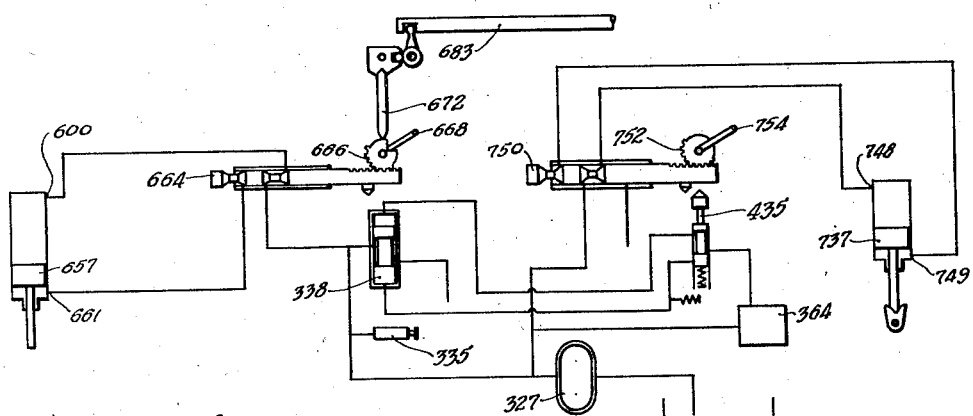
Figure 25 is a diagrammatic view of the hydraulic circuit in the vertical spindle carrier.

As shown in Figure 7, each of the shifting members is in the form of a collar surrounding an operating cam, having a radially extending cam follower in the form of a pin 119. The shifters 107 and 109 are mounted on the control cam 120 while the shifters 117 and 118 are mounted on the control cam 121. These cams are journaled in anti-friction bearings in the spindle carrier and are coupled together for joint control by a single member 122. To this end the cam 120 has secured to the end thereof a bevel gear 123 meshing with the bevel gear 124 secured to one end of a perpendicular shaft 125. The cam 121 has keyed to the end thereof a gear 126 in the form of a Geneva gear meshing with the mutilated gear 127. It will be noted from Figure 6 that the gear 127 has teeth formed on only a third of its periphery and that the teeth on the gear 126 are divided into three groups as determined by the wide faced teeth 128, 129 and 130. From the construction it will be seen that each revolution of the gear 127 will effect only one third of a revolution in the gear 126. The gear 127 is keyed to the stub shaft 131 which also has keyed thereto the bevel gear 132 meshing with the bevel gear 133 keyed to the other end of the vertical shaft 125. This shaft has a bevel pinion 134 meshing with the bevel gear 135 keyed to the end of the control shaft 136 which has the hand wheel 122 fixed to its outer end. A dial 137 is fixed to the control shaft and may be provided with suitable indicia on its beveled face for registering with a fixed mark on the carrier to indicate the various speeds of spindle rotation as they are effected.

From the construction it should now be apparent that the cam 120 may be given a complete revolution for each third of a revolution of the cam 121 whereby during engagement of any one of the back gears 114, 115 or 116 a selection of three speeds may be effected through the couplet 100 and gear 101 thereby making it possible for the spindle to be rotated at nine different speeds. A pivoted detent 136' having a roller 137' in the free end thereof is provided for engaging any one of three equally spaced indents 138 in the member 139 secured for rotation with the gear 127. This serves to retain the parts in their adjusted positions after each change of speed. Each horizontal carrier is thus provided with a nine speed variable transmission for the cutter spindle controlled by a hand wheel capable of effecting all nine speeds in one revolution.

*Transmission to spindle in vertical carrier*

The transmission to the vertical spindle will now be described, reference being had more particularly to Figures 8, 9, 13, 14, and 15. The spindle drive shaft 84 extends vertically upward through the horizontal spindle carrier to the drive bracket 140. Rotatably mounted in this bracket for free rotation on the shaft 84 are a pair of opposed bevel gears 141 and 142 meshing with the bevel gear 143 secured to the end of the horizontal splined shaft 144. A shiftable clutch member 145 is splined on the shaft 84 intermediate the opposed bevel gears and provided with a shifter fork 146 eccentrically mounted on the end of a rotatable stub shaft 147 mounted in an exterior wall of the drive bracket and provided with an operating handle 148.

Clutch member 145 is provided with clutch teeth 149 adapted to mesh with clutch teeth 150 on the gear 141 for driving the shaft 144 in one direction and with clutch teeth 151 adapted to mesh with clutch teeth 152 of the bevel gear 142 for driving the shaft 144 in the opposite direction. The control lever 148 is provided with a spring pressed pin 153 for selectively engaging sockets 154 and 154' for locking the clutch in either driving position and an additional socket 154" for retaining the clutch in neutral position.

The shaft 144 serves to rotate the vertical spindle and the clutch member 145 serves as a direction determinator whereby the vertical spindle may be rotated in either direction and independent of the direction rotation of the horizontal spindles. As shown in Figure 1, the splined shaft 144 extends horizontally through the vertical spindle carrier and is journaled at its other end in a bearing 155 mounted on the end of the cross rail 56. A bevel gear 156, Figure 13, is journaled in the vertical spindle carrier 57 in splined engagement with the drive shaft 144 and constantly rotated thereby in all transversely adjustable positions of the carrier. This gear meshes with a second bevel gear 157 keyed to the end of a vertical shaft 158 journaled in the carrier and having secured to its upper end a gear couplet 159.

The vertical cutter spindle 160 is journaled in anti-friction bearings in the carrier and adapted to be rotated at any one of thirty-two different speeds and for this purpose a variable speed transmission is provided in the upper end of the carrier, which is shown expanded in Figure 13. A spline shaft 161 has slidably mounted thereon three gear couplets 162, 163 and 164. The couplet 164 comprises two gears 165 and 166 shiftable respectively, into mesh with the gears 167 and 168 of the fixed couplet 159. As shown in Figure 14 this couplet is provided with a shifter 169 slidably mounted on the cam shaft 170 and is provided with rack teeth 171 meshing with a pinion 172 formed integrally on the end of stub shaft 173 journaled in an exterior wall of the carrier and provided with a manual operating lever 174. As shown in Figure 1, this lever may be moved to either one of two positions and by means of a spring pressed pin in the end of the lever may be locked in either one of these two positions. This construction provides two different speeds of rotation for the spline shaft 161.

The couplet 162 comprises the gears 175 and 176 shiftable into mesh with the gears 177 and 178 respectively, and the couplet 163 comprises the gears 179 and 180 shiftable into mesh with the gears 181 and 182 respectively, all the gears 177, 178, 181 and 182 being fixed for rotation with the intermediate shaft 183 which may be driven at any one of eight speeds. This shaft also has fixed thereon the gears 184, 185 and 191. A back gear shaft 186 is journaled in the carrier parallel to the shaft 183 and has slidably splined thereon the shiftable couplets 187 and 188, the first couplet comprising gears 189 and 190 shiftable respectively into mesh with the gears 191 and 178 while the couplet 188 has the gears 192 and 193 shiftable respectively into mesh with the gears 184 and 185 whereby the shaft 186 may be selectively driven at any one of 32 speeds. Secured to the end of the shaft 186 is the final drive pinion 194 stock 53 on the forward faces of which are formed guideways indicated generally by the reference numerals 54 and 54' for the reception of horizontal spindle carriers 55 and 55'. Also mounted upon these guideways for vertical adjustment is a cross rail 56 which supports for cross adjustment a vertical spindle carrier 57.

The horizontal carriers are mounted for vertical adjustment upon their respective columns and their adjustment as well as the cross adjustment of the vertical spindle carrier may be effected by manual means or by power means and at feed or quick traverse rates all of which will be explained hereafter. Power means have also been provided in addition to manual means for effecting vertical adjustment of the rail.

Since the horizontal spindle carriers and the cross rail are mounted for movement upon the same guideways interlocking means have been provided for automatically disconnecting the feed from a moving member to prevent collision with a stationary member and also for limiting the upward movement of the rail to prevent running off the guideways. All of the movable members are further provided with power clamping means and for this purpose each member carries a self-contained hydraulic system for supplying the power necessary to effect its own clamping. The horizontal carriers are provided with hydraulic counterweights thereby facilitating manual adjustment of the heavy carriers, as well as reducing the torque on the feeding mechanism necessary to initiate movement thereof. All of the movements of the adjustable parts, as well as the operation of the various hydraulic systems, are effected from a single prime mover, such as an electric motor 58, located in the base of the headstock of the machine. This motor, as well as the prime mover 59 of the table transmission, may be coupled together for joint control by a single switch located in the switch box 60 attached to the rear of the headstock.

*Main drive boxes—Figs. 1, 2, 3 and 17*

Located at the base of the headstock 52 is the right hand drive box 61 and at the base of the tailstock is the left hand drive box 62. As more particularly shown in Figure 3 a main drive shaft 63 is journaled in the right hand drive box and adapted to be driven from the motor 58 through a belt or chain 64 which drives a pulley 65 mounted for free rotation on the end of the shaft 63 but permanently connected with one-half of the friction disk clutch 66, the other half 66' of which is keyed to the shaft 63. Coupling of the pulley to the shaft 63 is effected by the shiftable clutch member 67 pivoting the clutch clamping fingers 68. The shiftable member 67 is provided with an annular beveled face 69 engaging the fixed cone shaped surface 70 upon retraction, which acts as a brake to retard rotation of the shaft. Clutch shifter 67 is further provided with an annular groove 71 which is engaged by the shifter fork 72 secured to the end of a shifter rod 73 reciprocably mounted in the base of the drive box and having spiral rack teeth 74 formed in the opposite end for engagement by the spiral gear 75 which is secured to the end of the shaft 76. This shaft is rotatably mounted in a fixed part of the drive box for effecting oscillation of the spiral gear and thereby reciprocation of the shifter rod 73 for effecting engagement and disengagement of the clutch. The shaft 76 is adapted to be controlled from a starting lever 77 pivotally mounted on the side of the bed and operatively connected to the shaft 76 by means of the crank arms 78, 79 and the connecting rod 80. The lever 77 and crank arm 79 are mounted on a shaft 76' which extends to the left side of the bed and provided with an additional control lever 77'. This permits operation of the main clutch from either side of the bed.

*Spindle transmission to horizontal carriers*

Figure 3:
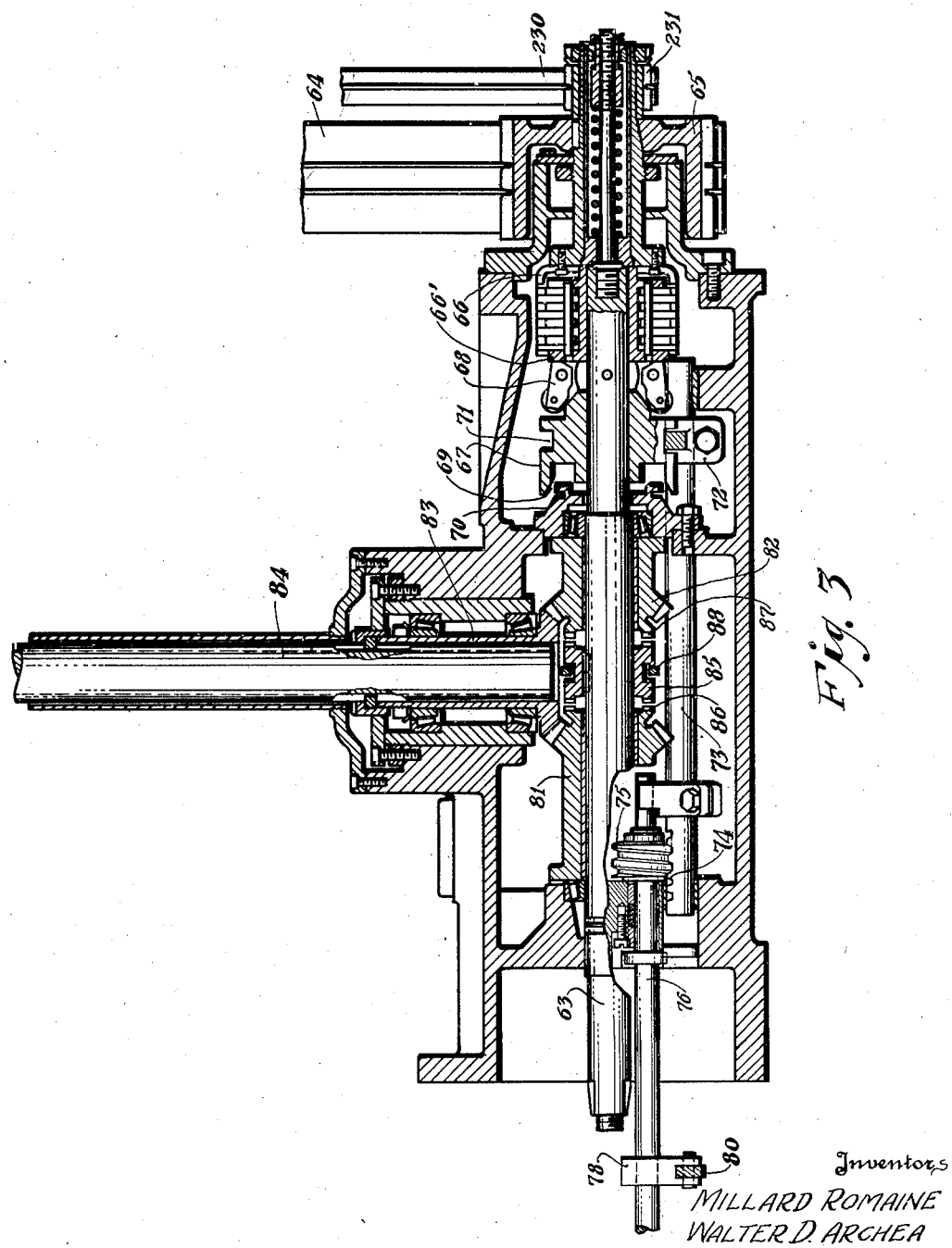
Figure 3 is a vertical section through the right hand drive box as viewed on the line 3—3 of Figure 2.

As more particularly shown in Figure 3 a pair of bevel gears 81 and 82 are mounted for free rotation on the shaft 63 in mesh with a bevel gear 83 secured to the end of the spindle drive shaft 84. This shaft serves to rotate the right horizontal spindle and the vertical spindle. A shiftable clutch member 85 is splined on the shaft 63 intermediate the clutch faces 86 and 87 formed on the ends of the bevel gears 81 and 82 respectively. The clutch is adapted to be shifted to the right or left to effect rotation of the shaft 84 in opposite directions by clutch shifter fork 88 oscillatably mounted on the end of shaft 89 having a manually operated lever 90, as shown more particularly in Figure 1. Movement of this lever to the right or left will determine the direction of rotation of the cutter spindle in the carrier 55 while a separate reverser, to be described hereafter, is provided for determining the direction of rotation of the vertical spindle. This makes it possible to jointly control the direction of rotation of these spindles or to independently determine their direction of rotation.

The shaft 63 is extended longitudinally into the left hand drive box 62 and is therein provided with a second reverser, similar to the one just described, for determining the direction of rotation of the spindle drive shaft 91 and thereby the spindle journaled in the horizontal carrier 55'. A manual lever 92 is provided for operating the reverser in a similar manner to the lever 90. The levers 90 and 92 are movable to a neutral position to disconnect the drive to their respective spindles which increases the selectivity of operation of the machine, in that the horizontal spindles may be rotated simultaneously or separately.

*Variable speed mechanism of horizontal spindles*

Figure 5:
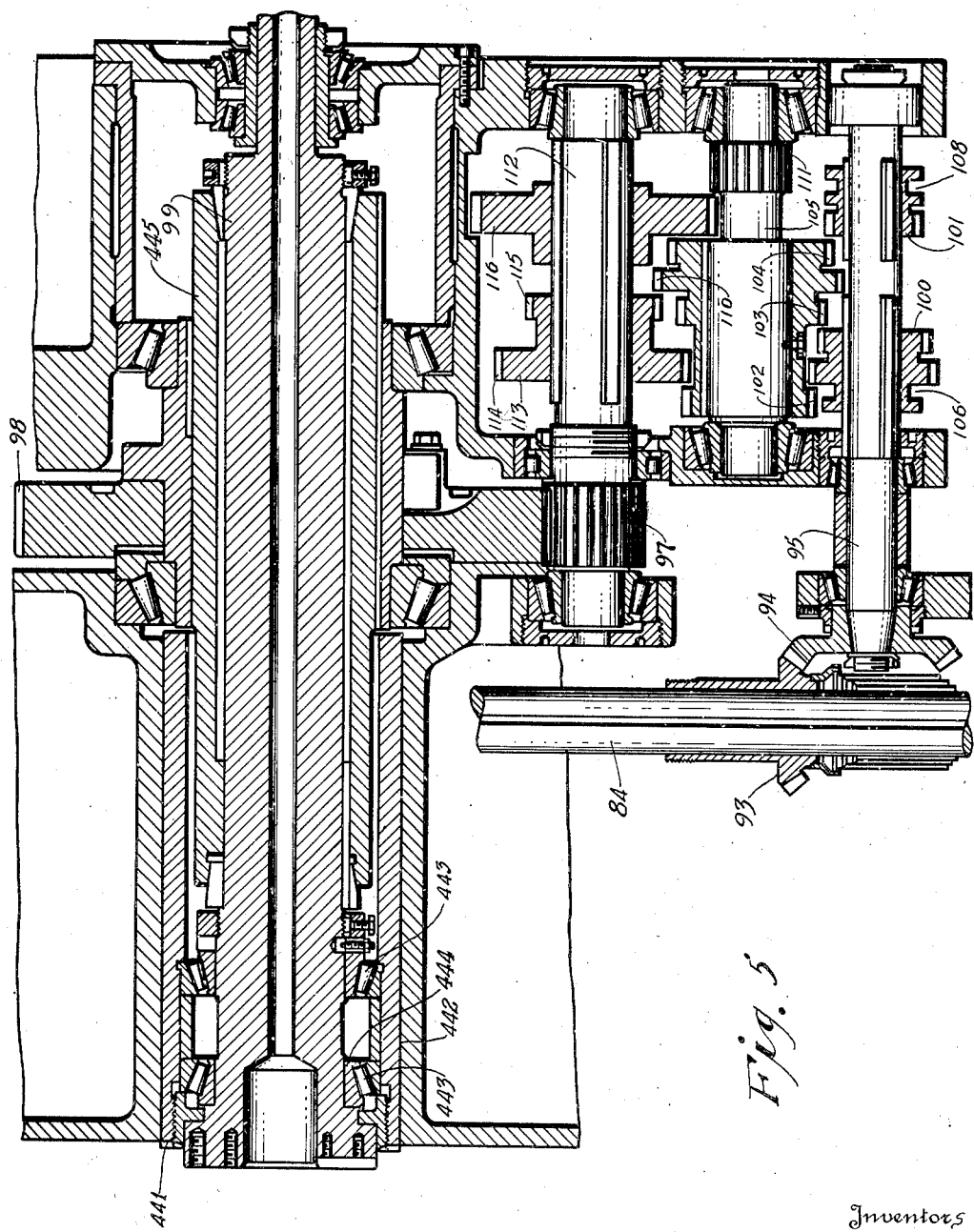
Figure 5 is an expanded view of the speed change mechanism in the horizontal spindle carrier.

The horizontal carriers 55 and 55' are each provided with a variable speed mechanism for actuating the cutter spindles journaled therein, and since each mechanism is the same, it is believed that the description of one will suffice for both. Referring more particularly to Figures 5, 6, and 7, the spindle drive shaft 84 for the right hand carrier is splined in a bevel gear 93 which is fixedly journaled in the spindle carrier for movement therewith and in constant mesh with a second bevel gear 94 keyed to the end of a horizontal shaft 95. This shaft constitutes the main drive shaft for the variable speed transmission which terminates in a drive pinion 97 meshing with the bull gear 98 splined on the cutter spindle 99.

The variable speed transmission includes a shiftable gear couplet 100 and a shiftable gear 101 splined for rotation with the shaft 95 but shiftable respectively, into mesh with gears 102, 103 and 104 fixed to the parallel shaft 105 for transmitting any one of three speeds thereto. The gear couplet 100 has an annular groove 106 engaged by the shifter fork 107 as shown in the expanded view, Figure 7, and the gear 101 has an annular groove 108 engaged by the shifter fork 109. The intermediate shaft 105 also has fixed thereto the gears 110 and 111. Slidably mounted on the shaft 112 is the shiftable couplet 113, comprising meshing with the bull gear 195 secured to the cutter spindle 160.

The shiftable couplets 162 and 163 are provided with shifter forks 196 and 197 respectively, slidably mounted on the cam shaft 170 and provided with follower pins 198 engaging cam grooves 199 and 200 respectively. Shiftable couplets 187 and 188 are provided with shifter forks 201 and 202 slidably mounted on the rotatable cam 203 and provided with follower pins 204 engaging cam grooves 205 and 206 formed in the periphery of the cam. It will be noted that the cam grooves are capable of effecting sixteen different combinations while the shiftable couplet 169 increases the number to thirty-two making in effect a low series of sixteen speeds and a high series of sixteen speeds.

To effect the series of sixteen speeds, one cam must be rotated four complete revolutions to one complete revolution of the other cam. To this end the cam shaft 170 has secured thereto the spur gear 207 meshing with the spur gear 208 which has integrally formed therewith a bevel gear 209 meshing with the bevel gear 210 keyed to the end of the operating shaft 211. The cam 203 has keyed to the end thereof the gear 212 which, as shown in Figure 15, is in the form of a Geneva gear divided into four quadrants and meshing with the mutilated gear 213 having teeth formed on only a quarter of its periphery whereby one revolution of gear 213 will effect only a quarter of a revolution of the gear 212. The gear 213 has integrally connected therewith a pinion 214 which also meshes with the spur gear 208. A detent 215 is also provided in connection with the Geneva gear for maintaining the parts in selected position. The shaft 211 extends through the outer wall of the carrier and is provided with an operating lever 216. This shaft may also have an indicia plate 217 registering with a fixed mark on the carrier for determining the various rates of speed effected in the spindle. This plate will carry two concentric series of speeds for the high and low series, and the series to be read will be determined by the position of the handle 174.

From the foregoing description it should now be apparent that the horizontal and vertical cutter spindles of this machine are driven from a common prime mover having a common starting clutch but provided with independent reversers each having a neutral position whereby either one or all of the spindles may be selectively or simultaneously rotated in the same or different directions; and that each cutter spindle is provided with its own variable speed transmission mounted in its carrier and movable therewith. This makes it possible to select the speed of rotation for each cutter spindle independently of the others. Although three spindle carriers have been shown for illustrative purposes, it is, of course, apparent that this number may be varied.

*Power feed and quick traverse elevation of carriers*

Figure 2:
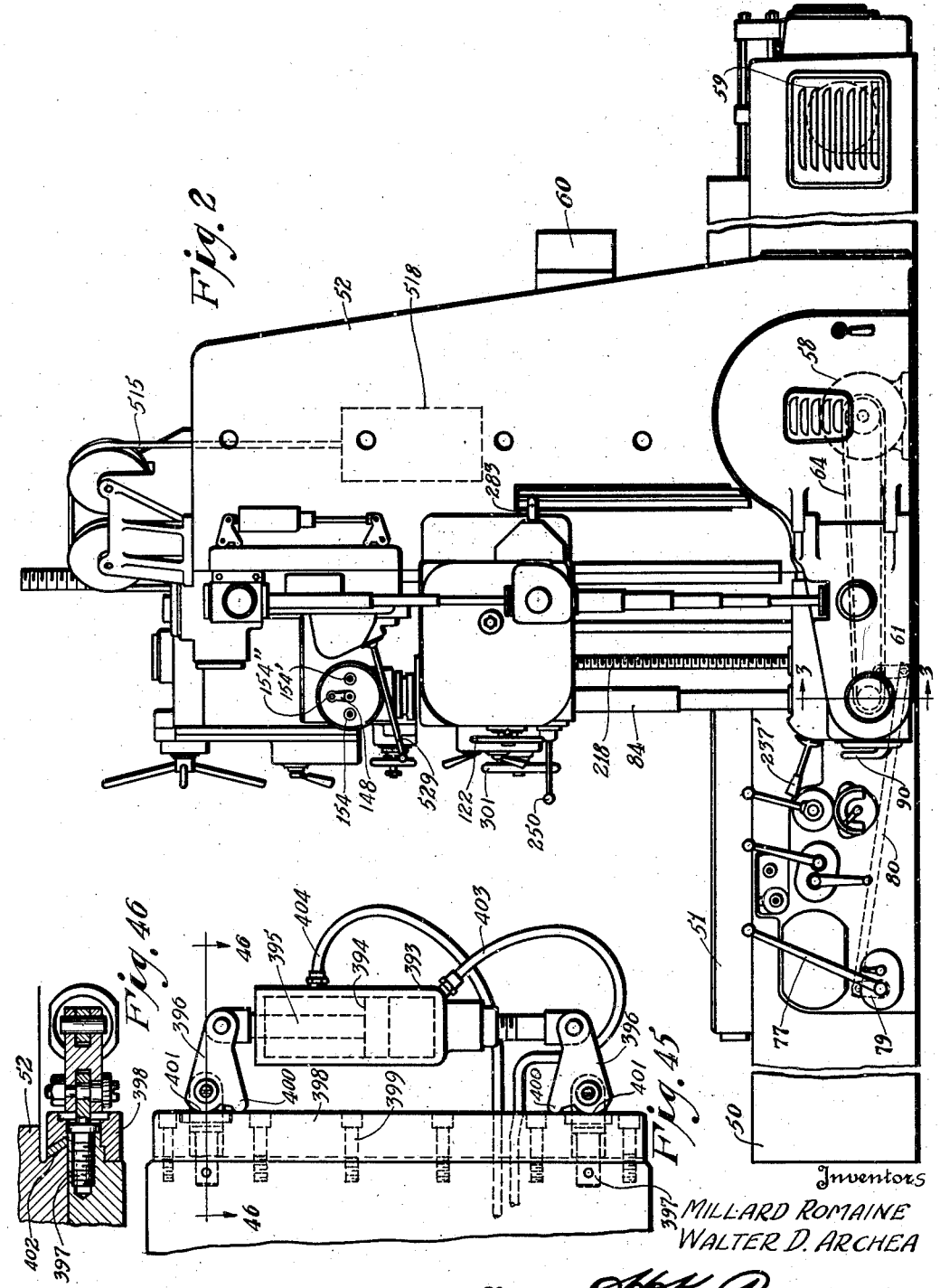
Figure 2 is a side elevation of the machine as viewed from the right in Figure 1.
Figure 4:
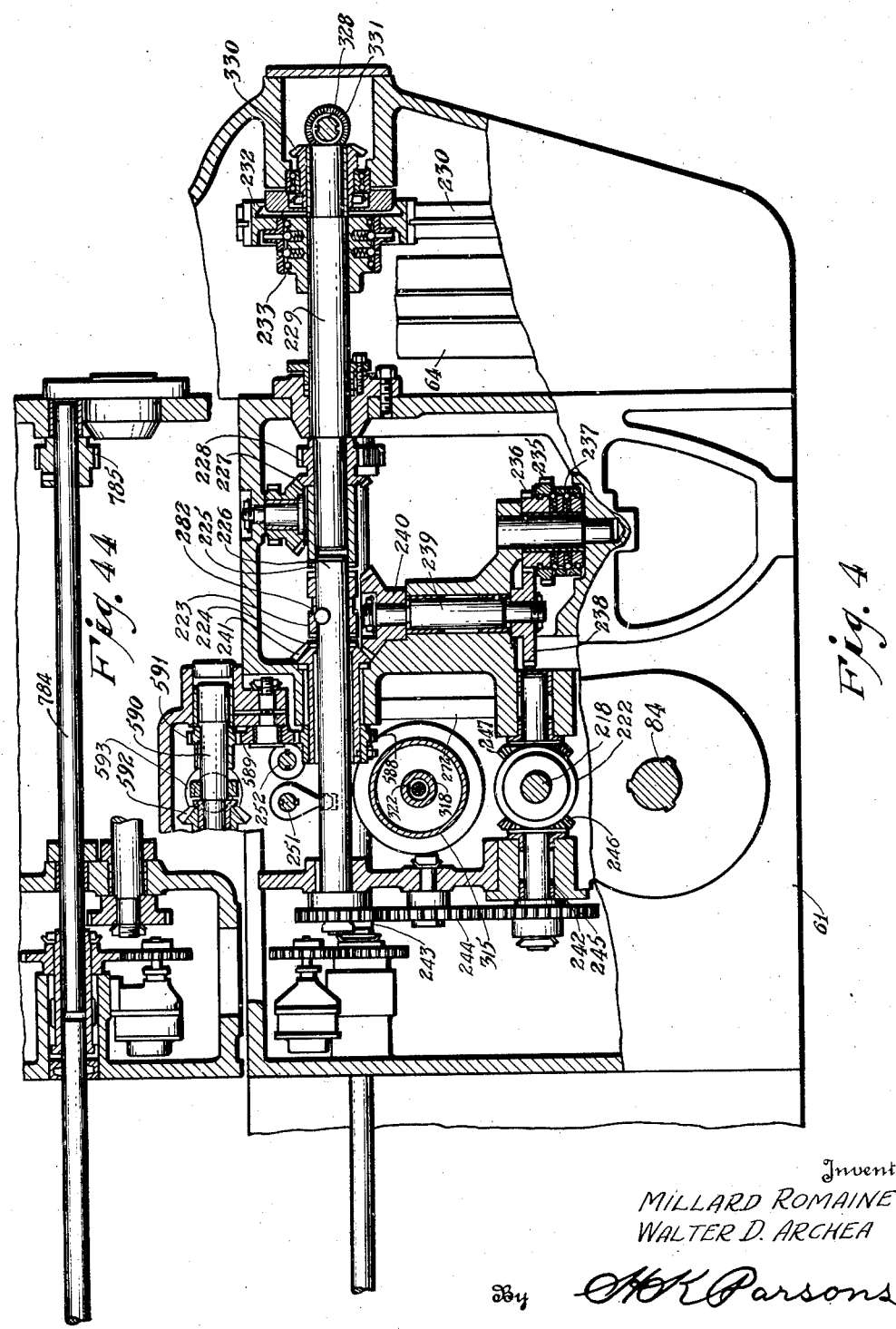
Figure 4 is a plan view of the right hand drive box partly broken away in section.

Each horizontal carrier is provided with an elevating transmission and control mechanism but since they are substantially the same for each carrier only the one for the right hand carrier will be described. The carrier elevating screw 218, Figures 2 and 4, is journaled at its lower end in the drive box 61 and fixed against longitudinal movement therein. This screw is threaded in a nut 219 fixed in the bottom floor of the carrier, Figure 20, and extends upward through the top wall thereof, as shown in Figure 23, where it is provided with a gear 220 splined thereon and journaled between thrust bearings 221. The gear 220 in the carrier serves to manually rotate the screw to traverse the carrier vertically while a bevel gear 222 keyed to the lower end of the screw in the drive box 61 is utilized for power traverse of the carrier.

The rate of power translation of the horizontal carrier is determined by the rate control clutch 223, Figure 4, slidably mounted between the feed clutch element 224 and the rapid traverse clutch element 225. The rapid traverse clutch element 225 is integral with the bevel gear 227 and spur gear 228 keyed for rotation with the shaft 229. This shaft is driven by means of a belt or other power transmitting band 230 from a pulley 231 formed integral with the main pulley 65. This band passes around a pulley 232 which is connected to the shaft 229 through an overload slip clutch 233.

The feed element 224 is driven at various speeds through a variable feed transmission mounted in the feed box 234 which may be of any suitable construction, the transmission shown in the patent to Hazelton, Number 1,315,722 issued September 19, 1919, being found suitable for present purposes. In any case the primary drive shaft to the feed transmission will be actuated by the gear 228 while the terminal or output member to the variable feed transmission will be coupled with the gear 235 surrounding the hub of the gear 236 and connected for driving the same through an overload slip clutch 237. The rate of feed may be varied by the control lever 237'. The gear 236 meshes with the spur gear 238 keyed to the end of the shaft 239 which has a bevel gear 240 keyed to the other end meshing with the gear 241.

It will be noted from the construction shown in Figures 3 and 4 that the feed and rapid traverse clutch members 224 and 225 will be constantly driven during actuation of the prime mover of the machine and will be unaffected by the starting clutch 67.

The shaft 226 drives the shaft 242 through spur gears 243, 244 and 245. The shaft 242 has mounted thereon the opposed bevel gears 246 and 247 which mesh with the bevel gear 222 previously mentioned as secured to the end of the elevating screw 218. The gears 246 and 247, Figure 51, have clutch teeth 246' and 247' formed upon their opposed faces for engagement with clutch teeth 248 formed upon opposite sides of the shiftable clutch member 249 splined on the shaft 242. Movement of the clutch 249 to the left will effect rotation of the elevating screw in such a direction as to cause upward movement of the carrier while shifting of the clutch to the right will effect downward movement of the carrier. The clutch 249 is also movable to a neutral position to stop all power movement of the carrier. The rate determining clutch 223 and the direction determining clutch 249 located in the drive box in the base of the machine are adapted to be remotely controlled from a single lever 250, mounted in the carrier and shown more particularly in Figure 19. To this end a pair of control rods 251 and 252 are fixed in the drive box for rotational movement but held against longitudinal movement, and extend upward through the carrier into splined engagement with crank arms 253 and 254 respectively mounted in the carrier. The arm 254 has a ball shaped end 255 engaging a socket formed in a collar 256 pinned to the connecting rod 257 which is reciprocably mounted in the carrier. This rod is reciprocated by a lug 268 Figure 16 depending from the shaft 263 having a rounded end 269 engaging a socket 270 formed in the end of the rod. Oscillation of the shaft 263 will cause oscillation of control rod 252. The other crank arm 253 is connected by means of a connecting lever 267 to one arm 259 of bell crank 258. A second arm 260 of the bell crank has a vertical slot formed in the end thereof for receiving the ball end 261 of a lug 262 extending radially from the rotatable and longitudinally shiftable shaft 263. This shaft has a second lug 264 projecting radially therefrom having a socket 265 formed in the end thereof for receiving the rounded end 266 of the universally mounted control lever 250. Reciprocation of shaft 263 will therefore cause oscillation of control rod 251. It should now be apparent that both control rods may be selectively actuated from a single lever mounted in the carrier.

As more particularly shown in Figures 4 and 51, control rod 252 has keyed to the end thereof a ball ended crank 271 engaging a socket in a shiftable rack member 272 meshing with the pinion 273 which is operatively connected with the shifter rod 274 of the direction control clutch 249. A shifter yoke 275 is connected to the shifter rod for movement therewith and embraces the clutch 249 by means of the groove 276. The pinion 273 has integrally formed therewith a notched arm 277 which is engaged by the pivoted detent 278 for locking the parts in any one of three positions. The control rod 251 has a similar ball ended lever 279 keyed to the end thereof in operative engagement with the shifter arm 280 which has a shifter fork 281 fixed to the end thereof engaging the annular groove 272 of the shiftable clutch member 223.

From the foregoing it should now be apparent that the carrier may be power traversed up or down at feed or quick traverse rates and that the rate and direction determining clutches are under the remote control of a single lever located in the carrier and in such a position that the operator may readily and easily control the movement thereof. Attention is invited to the fact that the lever 250 is a directional control lever in that movement to the right or left will select rate as feed or rapid traverse, while movement up in either one of these positions will cause the carrier to move up while movement down will cause downward movement of the carrier. The lever travels in an H-slotted plate as shown in Figure 1 to guide these movements.

*Automatic stop to limit movement of horizontal carrier*

To insure against damage to the carrier by collision with adjacent parts at the upper and lower extremes of its movement, an automatic stop or knockout has been provided comprising plunger 283 which is reciprocably mounted in the rear of the carrier, as shown in Figures 2 and 19, for movement by suitably formed dogs 284 mounted in the T-slot 285 formed in the side of the headstock 52. The plunger 283 has a socket 286 formed in the inner end thereof for receiving the ball shaped end of arm 287 of the bell crank 288 which is pivotally connected to the crank arm 289 by the connecting rod 290. The dogs may thus be positioned to automatically limit the movement of the carrier in either direction.

*Manual elevating means for horizontal carrier*

As previously mentioned, means have been provided, which are more particularly shown in Figures 20, 22 and 23, for manually elevating the carrier which may be desirable when setting-up the machine or effecting slight adjustments thereof and comprises the following mechanism. A spur gear 291 meshes with the gear 220 which is operatively splined to the elevating screw 218. The gear 291 is keyed to the shaft 292 which has the bevel gear 293 keyed to the end thereof in mesh with bevel gear 294 keyed to the end of the short shaft 295 having the spur gear 296 secured to the opposite end thereof. This gear meshes with a gear 297, Figure 20, keyed to one end of a hollow shaft 298. This shaft has clutch teeth 299 formed on the other end thereof. An independent shaft 300 is anti-frictionally journaled in the carrier co-axial with the shaft 298 and is provided with an operating hand wheel 301. The shaft 300 has a splined end 302 upon which is slidably mounted the clutch member 303 which is normally held into engagement with the clutch 299 by means of a spring 304 mounted in a bore 305 formed in the end of the shaft 300 and engaging a plate 314 fixed in the clutch member 303. When the clutch 303 is engaged, the hand wheel 301 may be rotated to move the carrier up or down.

*Interlock between power and manual elevating control means*

Means have been provided for automatically effecting disengagement of the clutch 303 whenever the carrier is being power traversed. To this end the shaft 263, Figures 16 and 20, is provided with an arm 306 having a notch 307 formed in the end thereof for receiving the beveled end of a reciprocable rack plunger 308 when the control lever 250 is in a neutral position. The rack plunger meshes with a pinion 309 which has integrally formed therewith a gear segment 310 meshing with a second rack plunger 311. This last plunger has an enlarged head 312 engaging the end of the knockout rod 313. This rod is slidably mounted in the bore of the hollow shaft 298 for engaging a plate 314 fixed in a counterbore in the end of the clutch member 303. With the parts in the positions shown in Figure 20 the spring 304 maintains the knockout rod 313 shifted to the right and thereby urging the rack plunger 308 into engagement with the notch 307. Upon movement of the control lever 250 either upward or downward the notch 307 will be moved out of registry with the rack plunger 308 thereby shifting it to the right and, through the gear and segment, effect shifting of the plunger 311 to the left. This will cause longitudinal movement of the knockout rod to the left against the pressure of the spring 304 and disengage the clutch member 303 from the clutch 299. In this manner the hand wheel 301 will be operatively disconnected from the elevating mechanism during power actuation thereof.

*Hydraulic counterbalance for horizontal carriers*

As previously stated, the horizontal carrier has been provided with counterbalancing means which in the present instance, is hydraulic. Referring to Figure 18, an elongated cylinder 315 is secured in the drive box in a position substantially under the center of gravity of the carrier and is of sufficient length that the piston 316 reciprocably mounted therein may have a travel equal to or greater than the length of travel of the carrier. Since it is desirable not to have the cylinder projecting above the top of the drive box as it may interfere with or limit the downward movement of the carrier, the cylinder may be projected below the bottom of the machine into its foundation if the height of the drive box is not sufficient to give the piston the desirable length of travel. The top of the cylinder is provided with a stuffing box indicated generally by the reference numeral 317 through which the piston rod 318 passes, the piston rod being integrally connected at one end to the piston and at the other end to the bottom floor of the carrier, as indicated more particularly in Figure 19. The piston rod has a bore 319 extending the full length thereof which is intersected by a radial bore or port 320 formed in the rod just above the piston head, thereby establishing connection between the upper chamber 321 of the cylinder and the fluid reservoir in the bottom of the carrier. A pressure tube 322 is mounted in the bore 319 and is of smaller outside diameter than the bore so as to provide clearance on all sides between the tube and the wall of the bore. This tube passes through and is sealed in a fluid tight plug 323 threaded in the end of the bore. This tube communicates with the lower chamber 324 of the cylinder for supplying pressure thereto which will counterbalance the carrier during elevation thereof. It should now be apparent that the annular space between the bore and the tube forms a channel establishing communication with one end of the cylinder and the tube constitutes a channel establishing connection with the other end of the cylinder.

The admission of pressure to the tube 322 and thereby to the chamber 324 is controlled automatically from the power elevating control lever 250 and the manual elevating hand wheel 301. In other words, if the lever 250 is moved to such a position as to cause elevation of the carrier, pressure will be admitted automatically to the chamber 324 to counterbalance and aid the carrier movement; or if the hand wheel 301 is manually rotated in such a direction as to cause elevation of the carrier, again pressure will be admitted automatically to the chamber 324. Contra, if the lever 250 is moved to a position that will cause lowering of the carrier or the hand wheel 301 is manually rotated in such a direction as to cause lowering of the carrier, the chamber 324 will be connected automatically to reservoir.

A separate control valve has been provided for each of the elevating mechanisms, that is manual and power, the valve indicated generally by the reference numeral 325 in Figure 16 being coupled with the power elevating mechanism and the control valve indicated generally by the reference numeral 326 in Figure 20 being coupled with the manual elevating mechanism. Hydraulic pressure is supplied through a pump 327 in Figure 19 mounted in the carrier and driven from a pump drive shaft 328 through bevel gears 329. As shown in Figures 2 and 4, this shaft extends into the right hand drive box and is actuated by a bevel gear 330 secured to the end of the shaft 229 meshing with a bevel pinion 331 keyed to the pump shaft. Since the shaft 229 is constantly actuated by the prime mover, the pump 327 will also be constantly driven during operation of the machine. This pump may be of any suitable type, a constant pressure gear type pump being found suitable in the present instance.

The interior of the carrier is used as a reservoir from which the pump will draw oil and force it through pipe 332 to the channel 333 formed in the distributor valve body 334, shown more particularly in Figure 49. The pump may be provided with a relief valve 335 to prevent the creation of excessive pressures therein. The channel 333 is in constant communication with a port 336 of the carrier clamp interlock control valve cylinder 337 having a valve piston 338 reciprocably mounted therein and normally in a position to maintain communication between the port 336 and a port 339 also formed in the cylinder. A channel 340 formed in the valve body connects the port 339 with the pressure port 341 of the power elevating counter-weight control valve 325. With the plunger 342 of this valve in the position shown in Figure 16, the pressure port 341 will be maintained in communication with port 343 leading to channel 344 which is connected by a flexible tube 345 with the pressure port 346 of the manual elevating counter-weight control valve 326, Figure 20. When the valve plunger 347 is shifted to the right, as shown in this figure, the pressure port 346 will be connected with the reservoir line 348 by means of port 349.

Figure 27:
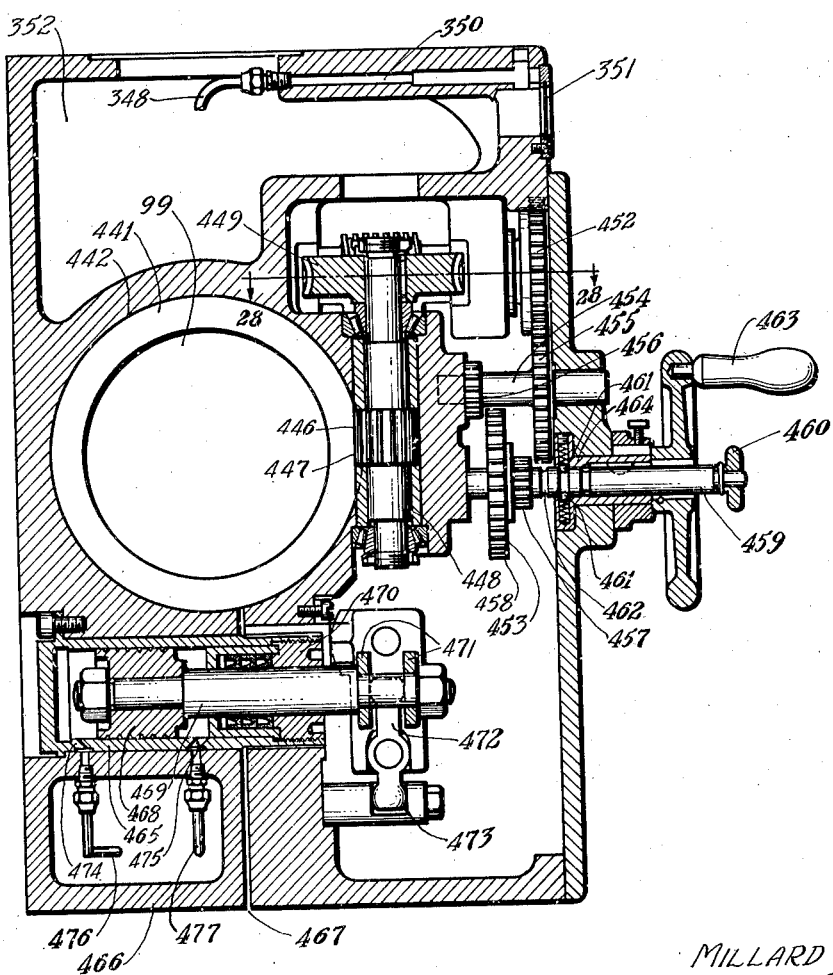
Figure 27 is a section on the line 27—27 of Figure 1, showing the quill adjusting and clamping mechanism for the horizontal spindle carrier.
Figure 42:
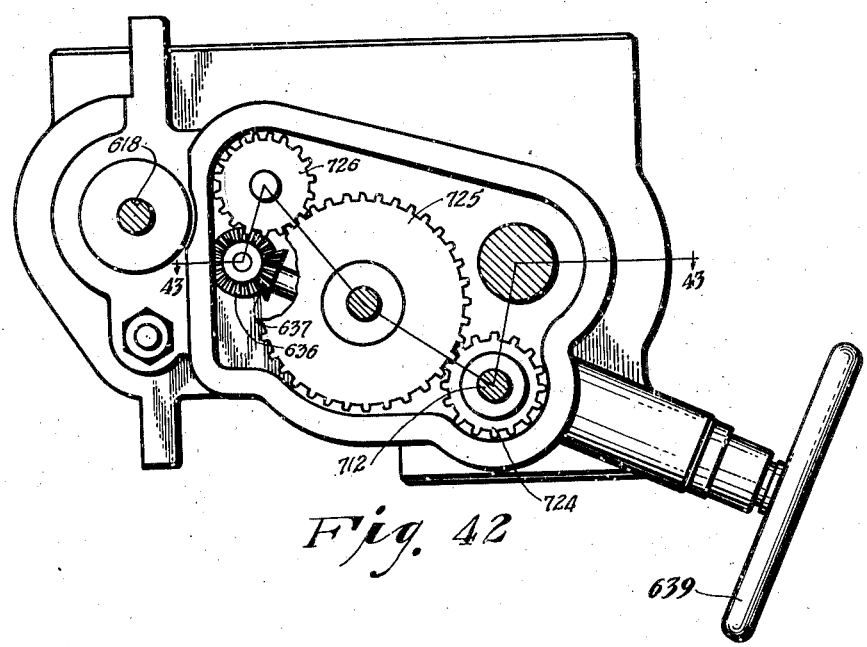
Figure 42 is a vertical section on the line 42—42 of Figure 1.

The reservoir line 348 is connected to a bore 350 formed in the top carrier wall, as shown in Figure 27, for conducting the fluid past a show glass 351 inserted in the front wall of the carrier so that the operator may observe if the pump is working. After passing the show glass the oil flows to an upper reservoir 352. The oil in this reservoir may be utilized for lubricating the bearings of moving parts by gravity flow after which it will return to the reservoir in the bottom of the carrier.

Figure 26:
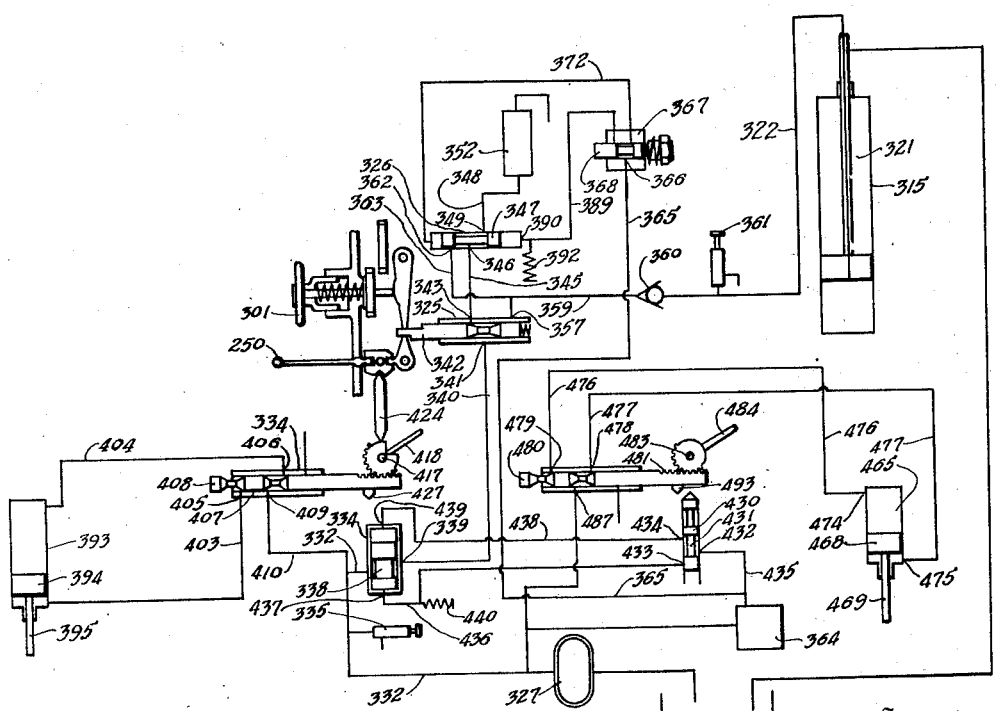
Figure 26 is a diagrammatic view of the hydraulic circuit in the horizontal spindle carrier.

It will thus be seen that the fluid flows through the two counter-weight control valves in series but at low pressure so that upon operation of either elevating mechanism fluid will be available for admittance to the counter-weight cylinder. For instance, if the lever 250 is moved upward to effect elevation of the carrier, it being noted that the lever 250 is a directional control lever, the valve plunger 342 will also be moved upward through intervening mechanism comprising a segment arm 353 meshing with a pinion 354, having integral therewith a gear segment 355 meshing with rack teeth 356 formed on the plunger 342. This upward movement of the plunger will connect the port 341 with a port 357 of channel 358, which is connected by means of a flexible tube 359 with the pressure tube 322 in the counter-weight piston rod through a check valve 360 and a relief valve 361, Figure 26.

While the plunger 342 is in its upward position it will be noted that the port 341 is disconnected from the port 343 thereby cutting off the pressure to the other counter-weight control valve 326. While the valve 342 is in its normal position however, as shown in Figure 16, the valve plunger 347 of valve 326 may be moved to the left upon operation of the hand wheel 301, through mechanism to be described presently, and thereby connect pressure port 346 with port 362 which is connected by means of channel 363 to the channel 359. During the downward movement of the carrier, the oil is forced from the lower end of cylinder 315 up through the channel 322 to the check valve 360, which is so positioned that the check will close from pressure in this direction and the oil will then be forced out through the relief valve 361 which is set at a suitable pressure to properly counterbalance the cylinder during its descent. As the volume of chamber 321 in the upper end of the cylinder increases, oil will flow by gravity to this chamber from the reservoir in the carrier through the passage 319 in the piston rod.

Although the valve plunger 342 of the power counterweight control valve 325 is shifted by mechanical means, the plunger 347 of the manual counter-weight control valve 326 is shifted by hydraulic means. This is effected by an auxiliary valve, shown more specifically in Figures 20 and 21, which is connected to the main pressure line 332 through a reducing valve 364. This reduces the high pressure of the pump to a low operating pressure sufficient for auxiliary purposes. A channel 365 extends from the reducing valve to the in-take or pressure port 366 formed in the valve cylinder 367. A reciprocable valve plunger 368 is mounted in the cylinder and normally maintained in a right hand position by means of a spring 369 interposed between a collar 370 on the end of the valve stem and the valve body. This establishes communication between the pressure port 366 and a port 371 which has connected thereto the pipe 372 leading to the left end of the valve 326 and thereby maintaining the valve plunger 347 in a right hand position.

The shaft 300 of the hand wheel 301 has keyed thereto a gear 373 meshing with a pinion 374 secured to one end of a shaft 375 which has a friction clutch member 376 reciprocably mounted upon the other end but fixed for rotation with the shaft. The clutch member is cone shaped for engaging a cone shaped socket in a second clutch member 377 secured to the end of a stub shaft 378. A nut 379 is threaded on the shaft 375 and a spring 380 is interposed between the nut and the clutch member 376 urging the same into frictional engagement with the clutch member 377. The engaging pressure may be varied by adjustment of the nut.

The shaft 378, as more particularly shown in Figure 21, is provided with a pair of radially extending lugs 381 to which are pivotally attached ratchet fingers or pawls 382. Mounted for free rotation on the shaft 378 is the valve shifting lever 383 having an enlarged hub 384 which has a laterally projecting peripheral flange 385 surrounding the pawls 382. The internal circumference of the flange is provided with ratchet teeth 386 for engagement by the ratchet pawls 382 to effect counter clockwise movement of the lever 383 and thereby a shifting of the valve spool 367 to the left, against the pressure of the spring 369. Rotation of the shaft in a clockwise direction will release the lever 383 and permit the spring 369 to return the valve spool to its normal right hand position.

The operation of this control mechanism is as follows: Rotation of the hand wheel 301 in a counter clockwise direction to effect elevation of the carrier will cause rotation of the auxiliary shaft 375 in a clockwise direction and thereby through the friction clutch, rotation of the coaxial shaft 378 in a similar direction. This will cause the pawls 382 to engage the ratchet teeth 386 and rotate the lever 383 which in turn will move the valve 367 to the left, as viewed in Figure 21, thereby connecting the pressure port 366 with the port 387 by means of the annular groove 388. A tube or pipe 389 connects this port with a port 390 in the right hand end of the valve 326. This will cause the valve piston 347 to be shifted to the left connecting the counter-weight cylinder with pressure to aid the upward movement of the carrier. This movement of the valve spool 368 to the left will simultaneously connect the port 371 to reservoir to permit the pressure in the left end of the cylinder 326 to be discharged to reservoir by means of a plurality of longitudinal grooves 391 formed in the valve spool.

It will be noted that the movement of the valve 368 is comparatively small and, therefore, the friction disk clutch has been utilized to allow slippage in the drive from the shaft 300 to the lever 383, the adjustment permitting the valve spool 368 to be immediately shifted upon movement of the hand wheel 301 but permitting continuous movement of the hand wheel as much as desired without disturbing the valve setting. It will also be noted that no means have been provided in the valve 367 for connecting the port 387 to reservoir and thereby relieve the pressure in the right hand end of the cylinder 326, this being taken care of by providing a choke coil 392 having a sufficient number of convolutions to maintain a sudden high pressure in the right end of the valve 326 for a sufficient length of time to effect shifting of the valve spool 347 to the left but which will permit a gradual escape to reservoir if a constant pressure is maintained in the left end of the valve.

After the carrier has been vertically translated to its adjusted position, power means have been provided for clamping it to the headstock which, in the present instance, comprises hydraulically actuated means, illustrated more particularly in Figures 45 and 46. A cylinder 393 having a piston 394 secured to the end of a piston rod 395 slidably mounted therein is supported on a fixed part of the carrier by a floating connection which comprises a pair of links 396 pivotally connected at one end to bolts 397 threaded in the carrier and at the opposite end to the piston rod and cylinder respectively. A guide strip 398 is supported on the carrier by suitable means, such as bolts or screws 399, and is provided with enlarged apertures to permit the bolts 397 to pass therethrough. The adjacent sides of the links are provided with lateral projections 400 which act as stops to limit the movement of the links toward one another. The end faces 401 of the links are finished to form a wedge cam engaging the surface of the guide plate 398 so that upon rotative movement of the links in a direction away from one another the guide plate will be clamped against the carrier guideway 402 on the column. The cylinder 393 has tubes 403 and 404 connected to opposite ends for conducting operating pressure to the cylinder.

Referring more particularly to Figure 24, the tube 403 is connected to the port 405 formed in the valve body 334 and the tube 404 is connected to the port 406 in the valve body. These ports communicate with a cylindrical bore 407 in which is slidably mounted the valve spool 408. A pressure port 409 also communicates with the bore 407 intermediate the ports 405 and 406. Pressure is supplied to this port direct from the pump through a channel 410, shown more particularly in Figure 49, which is formed interior of the valve body casting and has a branch extending parallel to the axis of the valve. A radial bore 411 extends from this branch passage to the port 409.

When the valve is in the unclamping position, as shown in Figure 24, pressure will flow from the port 409 around the annular groove 412 of the valve spool to the port 406 and thence through channel 404 to the upper end of cylinder 393 which will urge the links 396 toward one another as far as the lugs 400 will permit. When the pressure flows to the upper end of the cylinder, the lower end of the cylinder is connected to reservoir through the channel 403, port 405 and the portion of the bore 407 surrounding the reduced portion 413 of the valve spool. The valve spool 408 is shifted to the left, as viewed in Figure 24, to disconnect the pressure port 409 from the port 406 and connect it to the port 405 to effect clamping of the carrier, by means of rack teeth 414 formed on the enlarged end 415 of the valve spool engaged by gear quadrant 416 secured to the end of the rotatable shaft 417 having a control lever 418, Figure 16, secured to the end thereof.

The shaft 417 has also an indicator plate 419 secured thereto which has an arcuate groove 420 receiving a fixed pin 421. The pin acts in conjunction with the groove to limit the oscillating movement of the control lever 418. To lock the valve in any shifted position a spring pressed plunger 422 is slidably mounted in the valve body for engagement with circumferentially spaced indents 423 formed in the face of the plate and so positioned as to determine the operative positions of the valve. In operation, movement of the lever 418 in one direction will effect clamping of the carrier to its guideways while movement of the lever in the opposite direction will effect unclamping of the carriers.

By providing both power traversing means and power clamping means for the carrier, it will be apparent that the operator might attempt to power traverse the carrier while it is in a clamped condition, which might cause undue strain on the transmission and possible breakage of the parts. To safeguard against such an occurrence an interlock has been provided between the power traversing control lever and the carrier clamping control lever which, as shown more particularly in Figure 16, comprises a slidable pin 424. This pin is positioned between the valve stem 342 and an enlarged hub portion 425 of the gear segment 416. Each of these elements has a cone shaped socket 426 for receiving the pointed end of the pin, but the pin is of such length that upon movement of one of the members the pin will be forced into the socket of the other member thereby locking it against movement. It will, therefore, be seen that if the carrier is clamped, the pin will engage the rod 342 and prevent movement of the control lever 250 to a power traversing position; while if the lever 250 were moved to a power traversing position the pin would be shifted to prevent locking of the carrier until the power was disconnected.

It will be noted from Figure 49 that the pressure from the pump divides into two branches part flowing through channel 410 and part flowing to port 336 and normally thence to channel 340. In other words part of the pressure is utilized for counter-weight actuating purposes and part of the pressure for carrier clamping purposes, it being noted that when the fluid, flowing to branch 340, is not utilized for counter-weight operating purposes it is connected to the upper reservoir, as previously described in connection with Figure 27. Since the flow through this branch of the circuit is unconfined, a high pressure will not build up in the system and, therefore, pressure at the port 409 in the other branch will be at a minimum. It is desirable, however, that the maximum force possible be applied to the carrier clamping cylinder to effect initial setting of the clamping cams after which a nominal pressure substantially less than the initial clamping pressure will maintain the parts in clamped position aided by the self-locking character of the cams. To this end means have been provided for monentarily disconnecting the flow of pressure to the lubricating reservoir to effect a high pressure upon actuation of the carrier clamp control lever 418.

The valve plunger 408 is provided with a lateral projection 427, as shown in Figures 24 and 49, having beveled sides and engaging a pivoted bell crank 428 whereby a longitudinal shifting movement of the valve plunger in either direction will cause a complete oscillation of the bell crank. The other arm of the bellcrank is pivotally connected to a shuttle valve 430 having an annular groove 431 for connecting the pressure port 432 with either port 433 or port 434. The port 432 is connected with the reducing valve 364 through channel 435, it being recalled that this pressure is considerably lower than the pump pressure. The port 433 is connected by means of channel 436 to port 437 formed in one end of the cylindrical bore 337, and the port 434 is connected by means of channel 438 to a port 439 formed in the other end of said bore.

As previously described, the valve piston 338 is slidably mounted in this bore and normally is in a position to connect together the ports 336 and 339. This is due to the fact that the bell crank 429 is normally in the position shown in Figure 49 and the valve spool is, therefore, in a position to connect together the ports 432 and 434 maintaining the port 439 under pressure and the valve 338 shifted to the position shown. Upon oscillation of the bell crank by the projection 427, the valve spool 430 will be given a complete reciprocation. Upon movement to the left pressure port 432 will be connected with port 433 causing flow to take place in channel 436 thereby moving the valve spool 338 to a position closing the port 336. Since the movement of the bell crank is a substantially quick movement the movement of the valve spool 338 would also be of the same duration. This would not maintain the port 336 closed a sufficient length of time to accomplish the desired result. Therefore, the pressure in the end of the cylinder adjacent port 437 is not permitted to escape quickly but is led through a bleeder coil 440.

From the foregoing description of the general hydraulic system in the carrier it should now be apparent that while all the parts are stationary, the pump is being rotated and is pumping fluid from the lower reservoir to the upper reservoir through the various channels and valves described, which have sufficient resistance to maintain a substantial pressure in the system. This pressure, however, is well within the capacity of the pump and therefore will not overheat the pump nor overheat the oil. It will be noted that the valving is such that upon the demand for an extremely high pressure, suitable valve shifting as just described in connection with valve 430, will take place automatically to produce such pressure and after the demand has passed will return to normal. This results in a very efficient system in which high pressures are produced only at the time desired while at all other times the pressure will drop to normal. This relieves the pump of the necessity of maintaining a normally high pressure at all times which will be used at only widely spaced intervals, as well as reducing the strain on valve fittings and other parts, reducing the amount of leakage, and preventing overheating of the oil.

*Horizontal spindle carrier quill adjustment*

Figure 28:
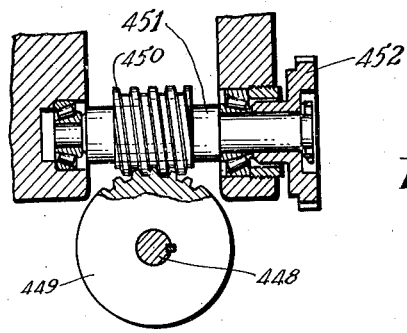
Figure 28 is a detail view on the line 28—28 of Figure 27.

Referring to Figures 5, 27 and 28, the horizontal spindle 99 is mounted in a quill 441 in the carrier 52 for axial adjustment toward and from the work table, the quill being slidably mounted in a bore 442 formed in the carrier. The quill is provided with internal anti-friction bearings 443, Figure 5, which are fixed therewith, the internal races 444 of which are fixed with the spindle so that upon axial movement of the quill the spindle will be adjusted therewith. For the purpose of maintaining a constant driving connection between the gear 98 and the spindle 99 a splined sleeve 445 is secured to the spindle in sliding engagement with the splined bore of the drive gear 98.

Means have been provided for effecting adjustment of the quill at either a fast or a slow rate. As more particularly shown in Figure 27 the quill 441 is provided with rack teeth 446 which are in operative engagement with a pinion 447 secured to a shaft 448 anti-frictionally journaled in a fixed part of the carrier. A worm gear 449 is keyed to the end of the shaft in mesh with a worm 450 journaled on a stub shaft 451 which is mounted in the carrier at right angles to the shaft 448. A drive gear 452 is secured to the end of the shaft 451 and is adapted to be driven at either a fast rate or a slow rate by means of a slidable gear couplet 453 and a fixed intermediate gear couplet 454. The couplet 454 comprises a large gear 455, which meshes directly with the drive gear 452, and a pinion gear 456. The couplet 453 comprises the pinion 457 and the spur gear 458, the pinion being selectively shiftable into mesh with the gear 455 to effect a slow adjusting movement of the quill, and the gear 458 being shiftable into mesh with the gear 456 to effect a rapid adjusting movement of the quill.

The couplet 453 is secured to a shaft 459 which is axially adjustable to determine the speed selection and for this purpose is provided with a manual control 460 for effecting these movements. To insure that the couplet will remain in its various shifted positions, spring pressed detents 461 are mounted in the shaft bearing, and adapted to engage suitably positioned grooves 462 in the shaft for maintaining the couplet in motion transmitting positions, as well as in a neutral position. A hand wheel 463 is secured to the end of a sleeve 464 which has a splined connection with the shaft 459 for imparting rotation to the latter. It should now be apparent that the quill may be adjused in either direction by rotation of the hand wheel 463 in the desired direction and at either one of two rates of speed, the selection of which is determined by the manual control 460.

After the quill has been longitudinally adjusted it is desirable that it be firmly clamped to the carrier in order to prevent chattering of the cutter. Hydraulic actuated means have been provided in the present instance for this purpose. A cylinder 465 is formed in a flexible part 466 of the carrier. This part is divided from the remainder of the carrier by a kerf 467 which extends from the exterior wall of the carrier to the quill bore 442. A piston 468 is slidably mounted in the cylinder and provided with piston rod 469 which extends through a stuffing box 470 in the end of the cylinder. The piston rod is provided on its exterior end with a pair of spaced collars 471. A double ball ended lever 472 is pivotally mounted in a fixed part of the carrier having one end mounted in a fixed socket 473 and the other end received between the collars 471. The cylinder is provided with a pair of ports 474 and 475 in opposite ends thru which hydraulic pressure is admitted to effect clamping or unclamping of the quill.

It should now be evident that upon the admission of pressure through the port 475 that the flexible part 466 of the carrier will be moved toward the fixed part and effect clamping of the quill while upon the admission of pressure to the port 474 the reverse will take place. Pipes 476 and 477 connect the ports 474 and 475 respectively with ports 478 and 479 formed in the quill clamp control valve mounted in valve body 334, shown more particularly in Figure 24. A valve plunger 480 is slidably mounted in the valve body 334 for controlling the admission of pressure to the quill clamping cylinder. The valve plunger is provided with rack teeth 481 for engagement by the pinion 482 secured to the end of the shaft 483 which is journaled in a forward wall of the carrier and provided with an operating handle 484 as shown in Figure 16 secured to the projecting end thereof. An indicator dial 485 is secured to the shaft 483 and is engageable by suitable detents 486 whereby the operator may observe the position of the valve to determine if the quill is clamped or not.

As previously explained in connection with Figure 24, the pressure channel 411 is continuously under pressure and is connected to inlet port 487 in annular grove 488 located between an annular groove 489 connected with port 479 and an annular groove 490 connected with the port 478. The valve plunger 480 is provided with reduced portions 491 and 492 whereby upon movement of the valve to the left, as viewed in Figure 24, the pressure channel 411 will be coupled with the port 478 and thereby, thru lines 477 and port 475, the pressure will be admitted to the quill clamping cylinder. The fluid in the opposite end of the cylinder will be exhausted through port 474, line 476, port 479, grooves 489 and 491, and exhausted to the exterior of the valve body from which it will flow by gravity back to the reservoir. Upon movement of the valve to the right, as viewed in this figure, the reverse actions will take place, pressure being admitted to the cylinder 465 through the port 474 and exhausted therefrom through port 475 to effect unclamping of the quill.

As previously explained in connection with the operation of the carrier clamp cylinder, it is desirable that a large pressure be momentarily exerted upon initiation of a clamping action to insure that the parts are properly clamped after which a normal clamping pressure will be sufficient to maintain the parts in their clamped position. To this end the valve plunger 480 is provided with a projecting portion 493 which is adapted to engage the bell crank 428 previously referred to, to operate the shuttle valve 430 to momentarily shut off the flow to the upper reservoir and thereby cause the pressure in the channel 410 to build up to a maximum. Attention is invited to the fact that the lever arm of the bell crank 428 is made sufficiently wide to serve both the valve plunger 408, as well as the valve plunger 480. It will thus be seen that when the lever 484 is operated to clamp the quill that an initial high pressure will be brought to bear to insure that the parts are properly drawn together after which a relatively lower pressure will maintain the parts in clamped position.

*Horizontal rail*

The transmission for effecting vertical translation of the horizontal or cross rail 56, as well as the mechanism for clamping the rail to its supports after adjustment, will now be described. The previously mentioned pump drive shaft 328 which is constantly driven by the prime mover is splined in the horizontal carrier for driving the pump thereof and extends from there vertically upward to the bracket 494, shown in Figure 1. This bracket is provided with a bevel gear 495 splined on the pump drive shaft and in constant mesh with a bevel gear 496 secured to the end of a horizontal shaft 497. The shaft 497 extends horizontally through the feed box 498, as shown in Figure 30, into the housing 499 attached to the rail, as shown in Figures 31 and 32. This shaft has keyed to the end thereof the spaced drive gears 500 and 501, the gear 501 meshing directly with a gear 502 and the gear 500 being operatively connected with a gear 503 through an idler gear 504.

From this it will be seen that the gears 502 and 503 are rotated in opposite directions and constitute a reverser, each of the gears having formed on their opposite faces clutch teeth for engagement with the shiftable clutch spool 505 having an annular groove 506 which is engaged by the shifter fork 507 secured to the shifter rod 508. The gears 502 and 503 are mounted for free rotation on the shaft 509 to which the clutch member 505 is keyed. Also, keyed on this shaft is a worm 510 meshing with a worm gear 511 which is keyed to the lower end of the rail elevating screw 512 which is anti-frictionally mounted in the housing 499. The screw extends upward into threaded engagement with a nut 513 secured in the end of a bracket 514 projecting from the top of the headstock 52. To insure against too much tension being put on the elevating screw, a counterweight has been provided comprising a cable 515 which is attached at one end, as at 516, to the cross rail and extends over a pair of sheaves 517 and has secured to the other end a counterweight 518.

Attention is again invited to the fact that the pump drive shaft is constantly driven from the prime mover and is, therefore, driven at a single rate which accordingly permits the rail to be traversed up or down at only a single rate of speed.

The shifter rod 508 for the rail elevating screw reversing clutch extends horizontally substantially the full length of the rail and is journaled at one end in a bracket 519 secured to the tailstock end of the rail and at the other end is journaled in the rail feed box 498. As more particularly shown in Figures 40 and 41, the end of the rod is provided with a collar 520 secured thereto having a socket 521 for receiving the ball ended lever 522 keyed on a horizontal shaft 523. This shaft has a ball ended lever 524 secured to one end thereof in engagement with one arm 525 of a bell crank 526 keyed to the upper end of a vertical rod 527. The lower end of this rod has an operating lever 529 attached thereto by means of a gimbal joint 528, Figures 38 and 39.

The ball ended lever 524 is provided, intermediate the ends thereof, with a second ball shaped portion 530 which is movable in a horizontal slot 531 formed in the end of the arm 525. The construction is such that upon rotation of the rod 527 by the lever 529 the arm 525 will oscillate with respect to the lever 524 without effecting movement thereof. The round end 532 of the lever 524 will merely rotate in its socket. Upon vertical reciprocation of the rod 527, the lever 524 will be rotated about its axis, due to engagement by the sides of the slot 531 with the ball shaped portion 530, which, in this instance, will cause oscillation of the end 532. It will, therefore, be seen that upon vertical movement of the lever 529 and rod 527 that the clutches 505 will be shifted to the right or to the left to cause power movement of the horizontal rail either upward or downward as desired and that rotary movement will not affect the clutches the purpose of which will be explained hereafter.

Means have been provided for clamping the horizontal rail to the carrier after adjustment and comprises four hydraulic clamps, similar to the one shown and described in connection with Figure 45. Their positions about the rail are shown diagrammatically in Figure 34. From this figure it will be seen that there is a clamp 533 at one end for securing the rail to the tailstock 53 and a clamp 534 for securing the rail to the outside faces of the headstock 52, a third clamp 535 which is mounted inside of the rail for securing the clamp to the sides of the guideway 54 and a fourth clamp 536 for securing the clamp to a rear guideway formed on the headstock.

To insure efficient positive operation of these clamps a separate source of hydraulic pressure has been provided comprising a pump 537, Figure 33, which is constantly driven from the drive shaft 497, through the gear 538 keyed to the shaft, as shown in Figure 30, meshing with the gear 539 secured to a shaft 540 mounted in anti-friction bearings in the feed box 498. The gear 539 meshes with a gear 540' keyed to the end of the pump shaft 541, as more particularly shown in Figure 29. As diagrammatically shown in Figure 33 this pump has an intake 542 through which it draws oil from a reservoir 543 located in the base of the feed box 498 and an outlet 544 which divides into two branches 545 and 546 extending to the control valve 549. A channel 548 conducts the fluid pressure from the control valve to the by-pass valve 547. The control valve is provided with two ports 550 and 551, port 550 having connected thereto the channel 552 which conducts the fluid pressure to all the clamping cylinders to effect clamping thereof while port 551 has connected thereto the channel 553 which conducts pressure to the opposite ends of all the cylinders to effect unclamping thereof. The control valve is also provided with a pair of exhaust ports 554 through which the fluid from the low pressure end of the cylinders, as determined by the particular movement being effected flows to the reservoir.

It is desirable in this instance as in the previously described pump circuits to make provision for the application of an initial high pressure at the beginning of a clamping action and which will then automatically drop to a relatively lower pressure for holding purposes after the clamping has been effected. By so doing the pump is not laboring continuously to maintain a high pressure and thereby become overheated, as well as overheating the oil, and a more economical installation results. The by-pass valve 547 has been provided for this purpose and comprises a valve plunger 555 having a reduced portion 556. With the parts in the position shown in Figure 33, the fluid in channel 545 will flow by way of the reduced portion 557 of the control valve plunger to port 550 and channel 552 to actuate the clamps, part of the fluid flowing to channel 548 where it will be blocked off momentarily because the valve 555 will be in a right hand position from that shown in Figure 33 or in other words in the position shown in Figure 36.

The fluid from the other ends of the cylinders will return by way of channel 553, port 551, reduced portion 558 of the control valve, exhaust port 554 and channel 559 into the reservoir 543. As the cylinders become clamped the pressure in the line 545 will build up which action is also true when the cylinders are being unclamped and this pressure will build up to a maximum determined by the relief valve 560 in the branch line 546. When the pressure is sufficient to lift the relief valve, fluid will flow through the channel 561 to the end of the by-pass valve cylinder moving the by-pass valve to the left or in other words to the position shown in Figure 33, connecting the channel 545 with the return channel 559. This will also connect the channel 561 with the return channel upon the completion of the valve movement. It will now be apparent that the pump pressure will drop to a normal figure depending upon resistance to flow through the various channels back to reservoir thereby maintaining a constant low pressure in the various clamping cylinders.

With the by-pass valve in the position connecting the pump with the reservoir and assuming that the control lever 529 is in a right hand position, as shown in Figure 35, in which position the rail is clamped to the headstock, movement of the lever 529 to the left will cause rotation of the shaft 527 which is operatively connected by means of an arm 562 of the bell crank 526 with the control valve plunger 549' thereby causing movement of the valve to reverse the connections to ports 550 and 551. At the same time, by means of rack teeth 563 integrally formed on the plunger meshing with a pinion 564 having integrally connected therewith a cam 565 engaging the end of the plunger 555, it will manually shift the by-pass control valve to disconnect the pump from reservoir and initiate the building up of pressure in the channel 545. It will be noted that the cam 565 is shaped like the pointed end of a heart and is given sufficient angular movement to move the by-pass valve plunger inward and then move to such a position as to permit the by-pass valve plunger to be moved outward by pressure in the opposite end of its cylinder. In other words, the cam as shown in Figure 37, is in the half-way position and upon completion of its movement will be entirely clear of the tapered end of the valve plunger so that upon movement of the plunger by pressure the tapered end of the plunger will engage one or the other of the depressions 566 formed in the cam thereby acting as a stop to limit the return movement of the plunger. Due to the shape of the cam it will be apparent that upon movement of the control lever 529 in either direction, as to the right or to the left in Figure 35, the by-pass valve will be closed and the pump pressure will be immediately raised.

For the purpose of obtaining firm and accurate clamping of the rail it is necessary that a reference surface be chosen in order that the rail will be in the same relative position with respect to the other parts of the machine, each time it is clamped, and thereby maintain accuracy in the machine. In the present construction the face of the guideway 54 which is parallel to the table 51 has been chosen as such reference surface and it is, therefore, necessary to the proper functioning of the clamping mechanism that the rail be moved into guiding contact with this surface before the other clamps which might prevent this movement have become tightened. For this reason the cylinders 535 and 536 operate before the cylinders 533 and 534 during clamping; while during unclamping it is desirable for interlock purposes, to be described later, that clamp 535 be the last to be released although, if so desired, they could all be released at the same time.

As previously mentioned, the admission of pressure to the channel 552, as shown in Figure 33, will cause clamping of the rail and this pressure will flow through the branch lines 567, 568, 569 and 570 to the respective cylinders 533, 536, 535 and 534. It will be noted that the channels 567 and 570 each have a check valve 571 and a by-pass valve 572 in parallel with the check valve, while the channels 568 and 569 are connected directly to their respective cylinders. The valves 572 may be set to a predetermined pressure but to a pressure which is lower than the pressure of the relief valve 560. Upon the admission of pressure to the channel 552 it will be immediately conducted by the channels 568 and 569 to the respective cylinders 536 and 535 thereby causing these cylinders to operate their respective clamps until the resistance builds up to the predetermined pressure of the by-pass valves 572. There will thus be exerted sufficient force to draw the rail into guiding contact with the reference surface and as the pressure builds up in these two cylinders the by-pass valves 572 will then open permitting pressure to flow to the other cylinders 533 and 534 to cause their actuation. Upon tightening of the clamps operated by these two end cylinders the pressure for the whole system will then increase uniformly until the blow-off pressure of the relief valve 560 is reached, which will then admit pressure to the by-pass valve 547 causing a drop to normal in the manner previously explained. Upon the admission of pressure to the channel 553 to effect unclamping, fluid will flow through the branch lines 573, 574, 575 and 576 to the respective cylinders 533, 536, 535 and 534. All of these channels are directly connected to their cylinders with the exception of cylinder 535 which has coupled in its channel 575 a check valve 577 and a choke coil 578. The choke coil impedes the flow from the cylinder 535 thereby insuring that it will be the last one to unclamp while the check valve 577 short circuits the choke coil during clamping.

The interlock couplet with the cylinder 535 is more particularly shown in Figure 40 and comprises a reciprocable interlock pin 579 having a beveled end 580 and a pointed end 581. The pointed end engages a detent 582 in the control rod 508 and the beveled end 580 is adapted to engage a beveled groove 583 formed in the side of the clamping arm 584 connected to the cylinder 535. The length of the pin 579 is such that it will permit movement of only one of the parts 584 or 508 at a time. When the cylinder 535 is in a clamped position the pin 579 will be moved into locking engagement with the control rod 508 and, by so constructing the hydraulic circuit that the cylinder 535 is the last to be actuated during the unclamping of the rail, it will insure that the control clutch 505 will be maintained in its neutral position and that it will be impossible to engage it by means of the control lever 529 to effect power actuation of the rail until the rail is entirely unclamped thereby preventing any undue strain being placed upon the parts, as well as possible breakage of the same.

An additional interlock has been provided between the horizontal rail and the horizontal carrier as it is possible for one to collide with the other since they are both mounted upon the same guideway. To this end an adjustable stop 585 is secured to the top of the horizontal carrier 55 in alignment with the control rod 527 so that upon downward movement of the rail, in which case the control lever 529 and control rod 527 would be in a downward position, the end of the control rod will engage the stop and be moved upward to move the clutch 505 to a neutral position and thus discontinue the travel of the rail.

A positive stop has also been provided for limiting the upward movement of the rail to prevent damage or breakage to the parts and comprises a fixed stop 586, Figure 40, secured to the headstock and properly positioned to engage an arm 587 secured to the end of the rotatable shaft 523 and rotate the same to effect longitudinal movement of the control rod 508 and thereby movement of the clutch 505 to a neutral position. The operation of the rail elevating and clamping mechanism is under the control of the single directional control lever 529 which, is movable to the left from the position shown in Figure 35 to effect unclamping of the rail and then movable up or down while in a left hand position to effect movement of the rail up or down and this movement is interlocked with the rotative movement to insure that the rail is entirely unclamped before traversing can take place. The interlock or stop means provide for disconnecting the power actuation upon approach of the rail toward the horizontal carrier and additional stop means have been provided for limiting the upward movement of the rail.

*Power traverse for vertical spindle carrier*

Since the vertical spindle is utilized for more varied purposes than the horizontal spindles, means have been provided for traversing the same along the rail at a plurality of feed rates, as well as at a rapid traverse rate together with control means therefor, comprising a rate determining clutch and a direction determining clutch both under control of a single manually operable directional control lever. Referring to Figures 4 and 17, it will be recalled that the bevel gear 241 constituted the feed element of the rate clutch 224, previously described in connection with the elevating screw transmission. This feed element is actuated from the sixteen speed feedbox located upon the top of the right hand drive box whereby the gear 241 may be actuated at any one of these feed rates. Integrally connected to the hub of the gear 241 is the spur gear 588 which, through an idler gear 589, drives the shaft 590 through a spur gear 591 keyed thereon. This shaft has a bevel gear 592 meshing with a bevel gear 593 secured to the lower end of a vertical shaft 594 which extends upward to the rail feed box, Figure 29, and there is splined in the gear 595.

The gear 592 is mounted for free rotation on the shaft 590 and provided with clutch teeth 760 on the end of its hub. A shiftable clutch 761 is splined on the shaft for engaging said teeth to couple the gear in driving relation with the shaft 590.

It is desirable for safe operation of the machine, to prevent movement of a cutter carrying member unless the cutter is rotating. For that reason the clutch 761 is provided and this clutch as well as the clutch 223 which controls the feed of the horizontal carriers and the rail, are interlocked with the spindle rotating clutch member 67.

As seen in Figure 17, a shifter rod 762 having a shifter fork 763 engaging the clutch 761 is provided with a socket 764 for receiving the ball ended lever 765. This lever is provided with a socket 766 in the other end for receiving the ball shaped end 777 of pivoted lever 778. A block 779 secured to the shifter rod 73, has a bolt 780 threaded therein for engaging the end of the lever 778 when the spindle clutch is disengaged and thereby through the mechanism just described, disconnect the clutch 761. Similar linkage comprising the pivoted member 781 operates to shift the rod 280 and thereby the clutch 223 to a neutral position upon disengagement of the spindle clutch. A spring 783 serves to return clutch 761 to driving position upon engagement of the spindle clutch.

There has thus been provided an interlocking mechanism which will disconnect the power feed to the traversing mechanism for all members carrying rotatable cutters, thereby insuring that the cutters will be rotating during feeding movement of their supports.

The gear 595 meshes with an idler gear 596 which, in turn meshes with the spur gear 597 mounted for free rotation on the vertical spindle carrier rate clutch. It will be noted from the previously described transmission that the bevel gear 241 is continuously driven from the prime mover and therefore, the gear 597 will also be continuously driven during operation of the prime mover.

The rapid traverse element 599 of the carrier rate control clutch is actuated from the shaft 540 through a pair of bevel gears 600 and 601. A clutch spool 602 is splined on the shaft 598 intermediate the feed gear 597 and the rapid traverse gear 601 and provided with clutch teeth on opposite faces for engaging clutch teeth on the respective gears. A shifter fork 603 engages an annular groove 604 in the clutch member 602 for shifting the same and is secured to the end of a vertical shifter rod 605 which extends vertically downward into the drive bracket 606 for operation by the control lever 607. The drive shaft 598 also extends downward into the rail drive bracket and has secured to the end thereof a bevel gear 608 constantly meshing with a pair of bevel gears 609 and 610 which are mounted for free rotation on the horizontal shaft 611. A clutch member 612 is splined on the shaft 611 and provided with clutch teeth upon opposite faces thereof for engaging clutch teeth, such as 613 and 614, formed respectively in the end faces of the gears 609 and 610. A shifter fork 615 engages an annular groove 616 in the clutch spool for shifting the same, and is secured to the shifter rod 617 operatively connected with the control lever 607.

The clutch 616 constitutes a reverser or direction determining clutch for the carrier traversing screw 618 integrally connected to the end of shaft 611. The screw 618 extends through a nut fixed in the carrier and is journaled at its other end in the bracket 519 secured to the tailstock end of the rail. The control lever 607 is provided with a spherical portion 619 medial of its length which is mounted in a socket formed in the wall of the drive bracket for universal movement; and is provided with a spherical shaped end 620 engaging a socket 621 formed in the end of a lever 622 keyed to the shifter rod 617. One end of this lever is made in the form of a gear quadrant 623 engaging rack teeth 624 formed on the rate clutch shifter rod 605.

From the construction it will be apparent that vertical movement of the shifter rod 605 will thereby shift the rate clutch to determine between feed and rapid traverse while horizontal movement of the control lever, while in either of its rate determining positions, will determine the direction of movement of the carrier as to the right or left.

The shifter rod 617 is extended through the carrier to the bracket 519 on the other end of the rail and there provided with a control lever 625 similar to the control lever 607 whereby the movement of the carrier may be controlled from either side of the table. If so desired, a third control lever may be splined on the shaft 617 and movable with the carrier but it will be apparent that such a control lever can only determine the rate of movement as between feed and rapid traverse as, due to its splined connection, it will not effect longitudinal movement of the shifter rod to determine direction.

Figure 43:
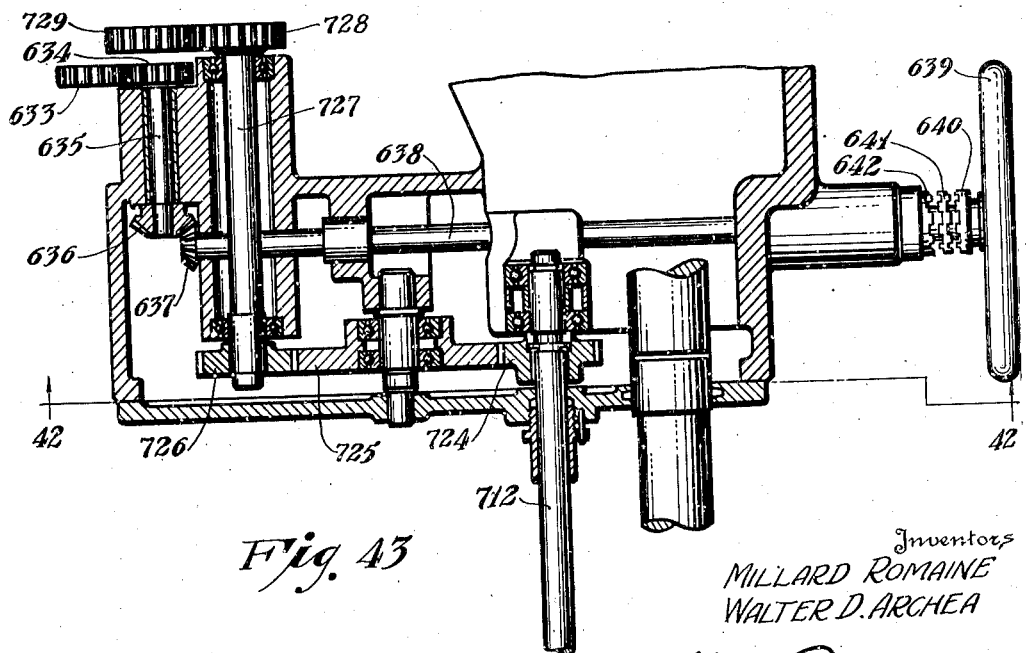
Figure 43 is an expanded view on the line 43—43 of Figure 42.

Means have been provided for effecting manual rotation of the lead screw 618 and comprises a spur gear 633, Figure 10, keyed to the shaft 611 meshing with a pinion gear 634, shown more particularly in Figure 43, which is secured to one end of a shaft 635 which has a bevel gear 636 secured to the opposite end. A second bevel gear 637 meshes with the bevel gear 636 and is secured to the end of the shaft 638 journaled in the end of the drive bracket and provided on the end with a hand wheel 639 which is provided with clutch teeth 640 for engagement with clutch teeth 641 formed on a collar 642 keyed to the shaft 638.

After the vertical carrier has been longitudinally adjusted on the cross rail, means have been provided for clamping it in position by hydraulic mechanism similar to that previously described including a pump 643 which, as more particularly shown in Figure 15, is adapted to be driven from the splined shaft 644 extending through the carrier and having a bevel gear 645 splined thereon in driving engagement with a bevel gear 646 secured to the end of the pump shaft. As shown in Figure 30, the shaft 644 is journaled in antifriction mountings in the rail feed box 498 and has keyed thereto the spur gear 645' driven from the gear 539 through the intermediate idler 647. As previously described, the gear 539 is continuously driven from the shaft 328 through the spur gear 538 and the pair of bevel gears 495—496. The pump 643 will, therefore, be continuously driven during operation of the prime mover.

The vertical carrier is adapted to be clamped to the cross rail by a pair of gibs 648 and 649, Figure 13, the gib 648 engaging the upper guideway 650 and the gib 649 engaging the lower guideway 651 formed on the rail. Each gib is adapted to be set into clamping action with the rail by a pair of bolts 652, as more particularly shown in Figure 53, which are mounted upon eccentrics 653 of the horizontal shaft 654 having keyed thereto the operating crank 655. This crank is pivotally connected to the end of a piston rod 656 having a piston 657 integrally formed on the end thereof and slidably mounted in a cylinder 658 formed in the carrier. The crank 655 is provided with an elongated slot 659 to permit rotation of the crank without effecting lateral oscillation of the piston. The cylinder 658 is provided with a pair of ports 660 and 661 formed in opposite ends thereof for the admission and discharge of fluid pressure to effect operation of the clamp. Each bolt 652 is provided with a nut 662 engaging a bevel countersink 663 formed in the gib. By adjusting the nut, the effective pressure of the gib may be slightly varied.

The hydraulic operation of the clamp is controlled by a slidable valve 664, as shown in Figure 54, which is similar in construction to the horizontal carrier clamp control valve 413, shown in Figure 24. It is similarly provided with rack teeth 665 meshing with a pinion 666 secured to a shaft 667 having an operating handle 668 fastened to the exterior end thereof. The shaft also has secured thereto an indicator plate 669 which is similar in construction to those previously described in connection with the horizontal carrier. Rotation of the lever 668 in one direction will cause the admission of fluid pressure to the cylinder to effect clamping of the gibs and in the other direction to effect unclamping of the gibs.

Since the carrier is power traversed it is possible that the power feed might be initiated while the carrier is clamped and thereby cause breakage of the parts. To prevent such an occurrence an interlock has been provided between the carrier clamp control lever and the power traversing control lever. To this end the shaft 667 has been extended and provided with a disk cam 670 having a V shaped notch 671 formed in its periphery. An interlock pin 672 is interposed between this cam and a gear segment 673. The gear segment also has a V shaped notch 674 for receiving the beveled end 675 of the interlock pin while the opposite end of the pin is beveled to engage the notch in the cam 670. The length of this pin is such that only one of its members 670 or 673 can be rotated at one time or in other words, upon the rotation of one member to an operating position the pin is forced into the notch of the other member to lock it against rotation.

The gear segment 673 is connected with the carrier traversing control lever 607 to prevent movement thereof to a power transmitting position at any time when the carrier is clamped by means of the following mechanism. The gear sector 676 is pivotally mounted about a pin 677 fixed in the carrier and provided with gear teeth 678 meshing with the gear teeth 679 formed on the periphery of member 673. A socket 680 formed in the side of the lever 676 receives the ball ended lever 681 of the bell crank 682, the other arm of which is pivotally connected to the forked end of connecting rod 683. A bell crank 684 is pivotally mounted in a fixed part of the carrier and has gear teeth 685 formed on the end of one arm in engagement with a gear sector 686 keyed to the shaft 627.

The other arm of the bell crank is pivotally connected to the end of the connecting rod by means of a pin 687. The shaft 627 extends into the drive bracket 498 and is provided on the end thereof with a gear 628 meshing with a bevel gear 629 on the end of a stub shaft 630 which has keyed thereto a spiral gear 631 meshing with spiral gear 632 keyed to the shifter rod 617 operated by the control lever 607. The shaft 627 extends through the carrier and is splined in the gear sector 686 which is fixed for movement with the carrier thereby permitting transverse adjustment of the carrier while still maintaining operative connection of the interlock. It should now be apparent that means have been provided for insuring against power traversing of the car-

Vertical spindle quill adjustment

As shown in Figure 13, the spindle 160 is journaled in anti-friction thrust bearings in the quill 688 which is slidably mounted in the spindle carrier for axial adjustment. The spindle is provided with a sleeve 689 secured thereto by a collar 690, and splined in a fixed hollow sleeve 691 journaled in the carrier bearing the gear 195 fixed therewith for effecting rotation of the spindle. This construction makes it possible to maintain a driving connection with the spindle in all positions of axial adjustment. The quill may be longitudinally adjusted by either manual or power means and to this end the quill is provided with rack teeth 692 for operatively engaging a spiral gear 693. This gear is secured to a stub shaft 694 having a spur gear 695 keyed thereon meshing with a gear 696 secured to the end of a shaft 697 which has a spiral gear 698 fixed thereon intermediate its ends and a large bevel gear 699 secured to the end thereof. A spiral gear 700 is fixed on the shaft 701 having a gear couplet 702 which is manually rotatable at a fast or slow speed by means of gears 703 and 704 adapted to be clutched with the shaft 705 by means of the clutch 706, the shaft having a hand wheel 707 keyed to the end thereof. The clutch is adapted to be moved into engagement with either of the gears 703 or 704 by a shifter rod 708 extending axially through the shaft 705, having an operating knob 709 fixed to its end. Detent means in the form of spring pressed balls 710 and 711 engageable with notches in the shifter rod are provided for maintaining the clutch in any one of three shifted positions. The detent 711 is adapted to engage either one of two notches to maintain the clutch in either of its power transmitting positions while the detent 710 is adapted to engage a notch located intermediate the previously mentioned pair of notches to maintain the clutch in a neutral position. By pulling the shifter rod in or out to either extreme position the proper gear will be coupled with the shaft 705 and upon rotation of the hand wheel 707 the quill be axially adjusted at the selected rate.

For machining operations, where it is desired to have a uniform feed, the gear 699 is connectible to a power shaft 712 through a pair of bevel gears 713 and 714 mounted for free rotation on the shaft and an intermediate clutch member 715 splined on the shaft. The clutch 715 is provided with clutch teeth upon opposite faces engageable with clutch teeth formed upon the opposing faces of the bevel gears. A shifter fork 716 secured to a shifter rod 717 engages an annular groove 718 in the clutch spool for determining the direction of movement of the quill upon movement of the shifter rod. Shifting of this rod is effected by means of a collar 718 secured to the rod, as more particularly shown in Figure 50, having rack teeth 719 formed thereon in engagement with gear teeth 720 formed on the periphery of a gear sector 721. This sector is keyed to a shaft 722 journaled in the wall of the carrier and provided externally with a control handle 723. It will be apparent that rotation of this handle will effect reciprocation of the shifter rod and thereby, through the clutch 715, determine the direction of power movement of the quill. The power shaft 712 is splined in the carrier to permit relative movement of the carrier with respect to the shaft. This shaft extends into the rail drive bracket, as more particularly shown in Figure 43, and is there provided with a gear 724 meshing with an idler gear 725 which, in turn, is driven by the spur gear 726. This gear is secured to one end of a shaft 727 which has secured to its opposite end a spur gear 728 meshing with a gear 729 formed integral with the bevel gear 609, as shown more particularly in Figure 10.

This bevel gear, it will be recalled, is unidirectionally driven by the shaft 598 which, in turn, is capable of being rotated at either a rapid traverse or a feed rate and that the feed rate is determined by the variable feed transmission in the feed box 234 located on the top of the right hand drive box at the base of the machine. The shaft 712, is, therefore, continuously driven and power movement of the quill may, therefore, be effected by the control lever 723. To prevent possible injury to the operator an interlock has been provided between the power and manual transmissions to the quill comprising an interlock pin 730 which has its opposite ends beveled, one adapted to engage a V-shaped notch 731 formed in the gear segment 721 and the other end adapted to engage a V-shaped notch 732 formed in the end of the shifter rod 708. The length of this pin is such that upon engagement of one of these members to effect longitudinal movement of the quill the pin will be moved into locking engagement with the other member.

After adjustment of the quill means have been provided for clamping it in its carrier to prevent vibration or chatter and to this end the lower part of the carrier has been divided as by a kerf 733 which intersects the bore for the quill thus providing a relatively flexible portion 734 and a fixed portion 735. A cylinder 736 is secured in the fixed portion and has reciprocably mounted therein a piston 737 having a piston rod 738 which is pivotally connected to a pair of levers 739 and 740 mounted upon opposite sides of the rod. A pair of clamping bolts 741 extend through the flexible portion into the fixed portion and these bolts are provided with heads 742 on opposite ends thereof. A clamping lever 743 is provided for each bolt and has a hook shaped portion 744, the back of which bears against a bearing portion 745 fixed with the carrier and the rounded end 746 of which engages the underside of the head on one end of the bolt. Since the head on the other end of the bolt engages the flexible portion 734, rotation of lever 743 about the bearing 745 as a pivot will cause longitudinal movement of the rod 741 to draw the flexible portion 734 toward the fixed portion 735 and thereby effect clamping of the quill. The lever 743 is pivoted in this manner to the lever 737 by the pin 747. The cylinder 736 is provided with a pair of ports 748 and 749 in opposite ends thereof and these ports are connected to a quill clamp control valve 750, shown more particularly in Figure 54, having rack teeth 751 engaged by a pinion 752 secured to the end of a stud shaft 753 journaled in the wall of the carrier and having an operating handle 754 secured to the exterior end thereof. The shaft 753 may be provided with an indicator plate 755 in the manner similar to the carrier clamp control valve. This valve is of identical construction to that shown in Figure 24 in connection with the horizontal carrier and further explanation thereof is not deemed necessary. The pump 643, shown in Figure 15, is connected to the control valves 664 and 750 by means of a by-pass valve similar in construction to that illustrated in Figure 49, whereby the pressure of the pump may be maintained at a normal amount except when high pressure is required.

Since the quill may be power operated, an interlock has been provided between the power traverse control lever and the quill clamping mechanism whereby upon the application of pressure to clamp the quill the power feed will be disconnected. The piston rod 738 is accordingly provided with a knock-out pin 756 having beveled faces 757 and 758 and the gear sector 721 keyed to the power control lever shaft 722 is provided with a slot, the sides of which slope outwardly. If the control lever has been moved to a power transmitting position and the quill is clamped the piston rod 738, which has a substantial length of operating movement, will cause engagement of one of the beveled faces of the pin with the angular side of the slot and cause rotation of the segment 721 to a center or neutral position thereby disconnecting the clutch 715.

Attention is invited to Figure 44 in which is shown the shaft 784 which is driven from gear 228 on shaft 229 by means of gear 785 keyed thereto. This shaft extends to the tailstock side of the machine and serves to actuate the elevating mechanism, pump drive shaft, etc., of the left hand spindle carrier. Thus the mechanism for the spindle carriers on each side of the table may be driven from a common prime mover.

A machine tool for large heavy work has thus been provided in which the parts are so proportioned and rigidly mounted as to prevent undue vibration or chatter; in which the cutter spindles may be easily and readily adjusted with respect to the work because of the improved power means under manual control for effecting the same; in which each spindle carrier as well as the rail is provided with its own hydraulic power system which under normal conditions operates at low pressures thereby conserving power as well as preventing overheating of the parts, and automatically increases to a relative high pressure upon power demand therefrom; and in which interlocking mechanism has been provided between the power feed control and clamp control for each movable part to prevent operation thereof by power when still clamped to its support. Additional devices such as remote directional control levers, improved hydraulic counterbalancing means, etc., have been provided whereby the operator may adjust the heavy movable parts of the machine with ease, convenience and alacrity and without the expenditure of great physical effort.

What is claimed is:

1. A machine tool having a bed, a work support reciprocably mounted upon the bed, a column adjacent said work support, a spindle carrier mounted on the column for movement relative to the work support, power means for effecting said movement including a prime mover mounted in the bed, a feed transmission, a rapid traverse transmission coupled with the prime mover for continuous actuation thereby, control means to vary the rate of the feed transmission, said transmissions terminating in a rate determining clutch, an elevating screw means coupling the clutch to the elevating screw including a reverser clutch, said clutches being mounted in the base of the machine, a single remote control lever mounted in the carrier for determining the positioning of said clutches, an H-slotted plate mounted on the carrier for guiding the movements of said lever, said lever having directional control whereby vertical movement of the lever in a determined direction will effect movement of the carrier in said direction.

2. A milling machine having a bed, a table reciprocably mounted upon the bed, a column, a spindle carrier reciprocably mounted upon the column for movement relative to the bed, power transmission means mounted in the bed for effecting translation of the carrier including a reverser clutch having a neutral position, a shifter rod extending from said clutch to the carrier, a remote control lever mounted on the carrier for actuating said clutch, a trip plunger mounted in the carrier in operative engagement with said shifter rod, and dogs carried by the column for tripping said plunger and thereby moving the shifter rod to determine the extent of movement of the carrier.

3. A milling machine having a bed, a table reciprocably mounted upon the bed, a column, a spindle carrier mounted on the column for translation relative to the bed, means for effecting said translation including a screw journaled in the base of the column, a nut mounted in the carrier in operative engagement with the screw, manual means mounted on the carrier for effecting rotation of the screw relative to the nut and thereby translation of the carrier, power means for effecting rotation of the screw relative to the nut to thereby translate the carrier, remote control means on the carrier for determining coupling of said power means, and an interlock between the manual control means and the power control means whereby the manual control means will be rendered inoperative upon movement of the power control means to an operative position.

4. A milling machine having a bed, a table reciprocably mounted upon the bed, a column, a spindle carrier mounted upon the column, means to effect movement of the carrier relative to the table including a pair of motion effecting elements one of which is mounted in the carrier and the other mounted in the base of the column, a hand wheel journaled in the carrier, motion transmitting means extending from the hand wheel to one of said elements, a clutch for coupling the hand wheel to said motion transmitting means, power means for effecting relative rotation between said elements, including a control lever therefor having a neutral position and a power transmitting position on either side thereof and means actuable to disconnect said clutch upon movement of the power control lever to either power transmitting position.

5. A machine tool having a column, a spindle carrier mounted on the column, means to effect translation of the carrier relative to the column including manually actuable means mounted in the carrier and power actuable means mounted in the base of the column, an hydraulic counterbalance for the carrier, a source of hydraulic pressure in the carrier and means to couple the pressure with the counter-balance upon actuation of either the manual or power translating means.

6. A milling machine having a support, a spindle carrier reciprocably mounted upon the support, an hydraulic counter-balance for the carrier including a piston and cylinder mounted in the support, a piston rod coupling the piston with said carrier, a source of pressure in the carrier, manually operable means for effecting translation of the carrier, and valve means for automatically coupling the pressure to said cylinder to counter-balance the carrier upon actuation of said manually operable means.

7. A machine tool having a column, a spindle carrying support slidably mounted on the column, means to counter-balance said support including a piston and cylinder mounted in the base of the column, a piston rod coupling the piston to said support, a source of hydraulic pressure in the support, a passageway formed in the piston rod and communicating with the lower end of said cylinder, means to couple the pressure with said passageway including a check valve and a relief valve, said relief valve being located between the check valve and the passageway whereby pressure may be admitted to the underside of the cylinder upon elevation of the carrier and discharged through said relief valve upon descent of said carrier.

8. A milling machine having a column, a spindle carrier reciprocably mounted upon the column, a spindle journaled in the carrier, a power transmission for rotating said spindle including a gear box mounted in the carrier, a pump mounted in the carrier, power means for actuating said pump, a channel extending from the pump to a lubricating reservoir for said transmission, a shuttle valve mounted in said channel, an hydraulic counter-balance for the carrier, a branch line extending from the valve to said counter-balance, means for effecting translation of the carrier, and means operable upon actuation of the translating means to shift the shuttle valve and thereby direct fluid to the counter-balance.

9. A machine tool having a fixed member, a movable member adjustably mounted thereon, means to effect relative movement therebetween including a hand wheel, an hydraulic counter-balance for the movable member, a source of pressure, a valve for coupling the pressure to the said counter-balance, a friction drive means actuable upon rotation of the hand wheel to move said valve to a coupling position and means to cause slippage in the friction drive means after movement of the valve to a coupling position whereby the hand wheel may be continuously rotated without effecting further movement of the valve.

10. A machine tool having a fixed member, a movable member mounted thereon for vertical translation, power and manual means to effect said translation, means to counter-balance said movable member during upward movement thereof including a cylinder and a source of pressure, a main line, a pair of valves in series in said line, said line extending to a lubricating system, a branch line extending from each valve to the counter-balancing cylinder, a power translation control lever coupled to one of said valves, a manual translation control lever coupled to the other of said valves, means to normally maintain the valves in position to couple the source of pressure to the lubricating system, said valves being shiftable upon actuation of the respective control lever coupled therewith to disconnect the pressure from the lubricating system and connect it to the counter-balancing cylinder.

11. A machine tool having a fixed member, a movable member mounted thereon, hydraulic means for clamping the movable member to the fixed member including hydraulically actuated clamping means, a source of pressure, a control valve for coupling the pressure to the clamping means, a lubricating system, a shuttle valve movable to one position to lead the pressure to the lubricating system, means operable upon movement of the control valve to a clamping position to close the shuttle valve whereby full pressure will be exerted on the clamps, and means to cause the shuttle valve to automatically return to open position a predetermined time after the movement of the control valve.

12. A spindle carrier for a machine tool having a quill reciprocably mounted therein, a cutter spindle journaled in the quill, means to adjust the quill longitudinally of the carrier to effect adjustment of the cutter spindle, hydraulically actuable means in the carrier for clamping the quill thereto, an hydraulic pressure creator mounted in the carrier, means to normally by-pass fluid therefrom to maintain a nominal low pressure in the system, valve means for coupling the fluid to the hydraulically actuated clamping means, a manually operable lever for the valve and means actuable by said lever upon movement of the valve means to a clamp effecting position to momentarily close the by-pass and thereby establish a relatively high initial clamping pressure in the system.

13. A machine tool having a head stock and a tail stock, a tool carrying cross rail mounted thereon, power means for actuating said rail including a direction determining clutch mounted on the rail, control means therefor including a manually operable lever, said lever being vertically movable for directional control of the rail, a plurality of hydraulically actuated camps for securing the rail to the head stocks after adjustment, said lever being movable in another direction to effect operation of said clamps.

14. A machine tool having a bed, a table reciprocably mounted upon the bed, a head stock and a tail stock projecting vertically above the bed upon opposite sides thereof, a cross rail reciprocably mounted upon the stocks, one of said stocks having a reference guide surface, means to clamp the rail to said guide surface to always locate the rail in the same position relative to the table, other clamps for securing the rail to the stocks, hydraulically actuated means for operating said clamps and means to effect clamping of the first named clamping means prior to the actuation of the remaining clamps whereby the rail will be positioned without hindrance from the remaining clamps.

15. A machine tool having a vertical member, guideways formed thereon, a movable member translatably mounted upon said guideways, power means for effecting said translation including a power control lever, a plurality of hydraulically actuated clamps for securing the movable member to the fixed member after said translation, one of said clamps being interlocked with the power control lever to prevent actuation of the lever while the clamp is active and means to delay the release of said interlocked clamp relative to the other clamps to positively prevent operation of the control lever until all the clamps are released.

16. A machine tool having a support, guideways formed thereon, a movable member translatably mounted upon said guideways, power means for effecting said translation including a power control lever, a plurality of hydraulically actuated clamps for securing the movable member to the fixed member after said translation, one of said clamps being interlocked with the power control lever, means to delay the release of the interlocked clamp relative to the other clamps to positively prevent operation of the control lever until all the clamps are released, and an independent hydraulic system in the movable member for actuating said clamps.

17. A machine tool having a pair of spaced vertical columns, a cross rail reciprocably mounted upon the columns, power means for effecting the reciprocation, hydraulically actuated means for clamping the rail to the columns, said rail having a power actuated pump mounted on the end thereof, a reservoir formed in the rail, means to draw fluid from said reservoir to supply pressure to said clamps, a shuttle valve for diverting part of the fluid back to the reservoir to maintain a nominal pressure in the system, a clamp control valve, a lever mounted on the rail for controlling the power reciprocating means and actuating said control valve, and means actuable upon movement of the control lever to a clamp actuating position to momentarily close the shuttle valve and thereby create a temporary high pressure in the system to initially operate the clamps.

18. A machine tool having a column, guideways formed upon said column, a spindle carrier reciprocably mounted upon said guideways, a cross rail reciprocably mounted upon said guideways, independent power actuable means for effecting translation of the carrier and the cross rail, individual controls for said means and automatic means to disconnect the power actuating means of one member to prevent collision with the other member.

19. A machine tool having a head stock and a tail stock, a work support reciprocably mounted between said stocks, a cross rail vertically movable upon said stocks toward and from the work support, a spindle carrier reciprocably mounted upon the cross rail, power means for effecting translation of the spindle carrier, a directional control lever mounted on the end of the rail for determining the coupling of said power means, a source of hydraulic pressure in the carrier, hydraulically actuated means for clamping the carrier to the rail, a control lever mounted on the carrier for determining actuation of said clamping means, and an interlock between the clamp control lever on the carrier and the translation control lever on the end of the rail to prevent power translation of the carrier when clamped by said hydraulically actuated means.

20. A milling machine having a pair of spaced stocks, a work support reciprocably mounted between said stocks, vertical guideways formed upon the stocks, a cross rail reciprocably mounted upon the guideways, a vertical spindle carrier mounted on the cross rail for transverse movement, said spindle carrier having a quill reciprocably mounted therein, a cutter spindle journaled in the quill, power means for feeding the quill and thereby the spindle toward and from the work support, hydraulically actuated means for clamping the quill to the carrier after adjusting movement including a control valve, a control lever for said power means, a control lever for said valve and an interlock between said control levers to prevent power reciprocation of the quill while the same is clamped by said hydraulic means.

21. In a milling machine having a work support, a plurality of spindle carriers adjustable relative to the support and a cutter spindle journaled in each carrier, the combination of transmission and control means for effecting power adjustment of the carriers and rotation of the spindles including a prime mover, a main shaft continuously actuated thereby, a branch transmission extending to each spindle, a common drive shaft therefor, reversers for selectively coupling the branch transmissions to the common drive shaft for independently determining actuation or direction of rotation of each spindle, a main clutch for coupling the common drive shaft to the main shaft for jointly determining operation of the spindles by the prime mover; an auxiliary shaft continuously driven by the main shaft, branch transmissions selectively actuable by the auxiliary shaft for traversing the carriers and including a rate determining clutch and a direction determining clutch in serial power transmitting relationship, a single rate and direction control lever mounted on each carrier, and motion transmitting means coupling each lever with its respective rate and direction determining clutches.

22. A milling machine having a bed, a table reciprocably mounted upon the bed, a head stock and tail stock positioned at opposite sides of the bed, a spindle carrier mounted on each stock, a cutter spindle journaled in each carrier, means for effecting power adjustment of the carriers relative to the table including a prime mover, a drive shaft continuously actuated thereby, individual branch transmissions extending from the drive shaft to the carriers, each branch transmission including a rate clutch and a direction determining clutch, a remote control lever mounted on each carrier for operating its respective clutches to effect adjustment of the carrier, said lever having a neutral position for disconnecting all power to the carrier, hydraulically actuated means for clamping each carrier to its stock after adjustment including a pump mounted in each carrier, individual pump drive shafts continuously actuated by the first named drive shaft and control means mounted on the carrier and operable when said control lever is in a neutral position to effect actuation of the clamping means.

23. A milling machine having a work support, a head stock and tail stock positioned upon opposite sides thereof, a spindle carrier reciprocably mounted upon each stock for movement relative to the support, a cross rail slidably mounted at opposite ends on the stocks, an additional spindle carrier mounted on the cross rail, power means for effecting translation of all the spindle carriers and the cross rail including a prime mover mounted in the base of the machine, independent branch transmissions for traversing each carrier, a common drive shaft therefor continuously actuated by the prime mover, individual rate and direction determining clutches for coupling each branch transmission with the common drive shaft, a second shaft continuously actuated by the common drive shaft extending to the rail, an elevating screw therefor, a horizontal shaft journaled in the rail in driving relationship to the second shaft, a reverser for coupling the horizontal shaft to the screw, a directional control lever mounted on the rail adjacent the head stock for actuating said reverser and an additional directional control lever mounted on the opposite end of the rail for operating said reverser whereby movement of the rail may be controlled from either side of the table.

24. A milling machine having a work support, columns on opposite sides of the work support, a horizontal spindle carrier reciprocably mounted upon each column for relative movement with respect to the work support, a cross rail reciprocably mounted upon the column, a vertical spindle carrier mounted on the rail for movement transversely of the work support, power means for traversing the carriers including a prime mover, a drive shaft continuously actuated thereby, a branch transmission for each horizontal carrier including a feed and rapid traverse transmission actuated by the drive shaft and terminating in a feed clutch element and a rapid traverse clutch element, a shiftable clutch member interposed between said elements for determining the rate of carrier movement, an additional branch transmission for the vertical carrier including a rate clutch having a feed clutch element and a rapid traverse clutch element, a branch transmission continuously actuated by the drive shaft for actuating the second named rapid traverse clutch element, a branch transmission extending from the first named feed clutch element to the second named feed clutch element for actuation thereby, a feed screw for the vertical spindle carrier and a reverser mounted in the rail for coupling the rate clutch with the feed screw to effect power translation of the vertical carrier.

25. A milling machine having a work support, a plurality of spindle carriers adjustably mounted relative to said support, a cutter spindle journaled in each carrier, a power transmission for traversing said carriers including independent feed and rapid traverse clutches for each carrier, the feed clutch element of one carrier being driven by the feed clutch element of another carrier, a selector clutch interposed between said feed clutch elements, a power transmission for actuating the spindles, a prime mover, a main clutch for coupling the spindle transmission with the prime mover, a control lever, a shifter rod actuated thereby for engaging and disengaging said main clutch, and means actuable by the shifter rod upon disengagement of the spindle clutch to disconnect the carrier clutches from the feed elements and disconnect the selector clutch to thereby prevent feeding of the carriers while the cutter spindles are stopped.

26. A machine tool having a bed, a table reciprocably mounted upon the bed, a rotatable cutter spindle mounted at each side of the table, means to rotate said spindles including a prime mover, a main transmission, a starting clutch for coupling the transmission to the prime mover, a control lever mounted on each side of the table actuating said clutch, a second prime mover for effecting reciprocation of the table and a joint control switch for starting and stopping said prime movers.

27. A machine tool having a bed, a table reciprocably mounted upon the bed, a column, a spindle carrier mounted on the column having a spindle journaled therein, power means for effecting rotation of the spindle and elevation of the spindle carrier including a prime mover mounted in the bed, a main clutch, a spindle transmission connectible by the clutch to the prime mover, a feed transmission and a rapid traverse transmission actuated by the prime mover exclusive of said clutch, said transmissions terminating in opposed final clutch elements, an elevating screw journaled at one end in the bed, a nut mounted in the carrier for receiving said screw, a final drive shaft to the screw, a clutch member mounted on said shaft and selectively shiftable into engagement with said final clutch elements for determining rotation of the screw at fast or slow rates, an additional clutch for coupling the final shaft to the elevating screw to determine the direction of movement of the carrier, a control lever mounted on the carrier, and motion transmitting means coupling the lever to the control clutches for the elevating screw whereby the lever may be moved in one plane to preselect the rate of movement, and in another plane to effect rotation at that rate.

28. A machine tool having a bed, a table reciprocably mounted upon the bed, a column, a spindle carrier mounted on the column having a spindle journaled therein, power means for effecting rotation of the spindle and elevation of the spindle carrier including a prime mover mounted in the bed, a main clutch, a spindle transmission connectible by the clutch to the prime mover, a feed transmission and a rapid traverse transmission actuated by the prime mover exclusive of said clutch, said transmissions terminating in opposed final clutch elements, an elevating screw journaled at one end in the bed, a nut mounted in the carrier for receiving said screw, a final drive shaft to the screw, a clutch member mounted on said shaft and selectively shiftable into engagement with said final clutch elements for determining rotation of the screw at fast or slow rates, an additional clutch for coupling the final shaft to the elevating screw to determine the direction of movement of the carrier, a control lever mounted on the carrier, motion transmitting means coupling the lever to the control clutches for the elevating screw whereby the lever may be moved in one plane to preselect the rate of movement, and in another plane to effect rotation at that rate, and dog actuated means for effecting return movement of said lever in the last named plane to stop the movement of the carrier.

29. A machine tool having a bed, a table reciprocably mounted upon the bed, a rotatable cutter spindle mounted at each side of the table, means to rotate said spindles including a prime mover, a main transmission, branch transmissions extending to the respective spindles, a starting clutch for coupling the main transmission to the prime mover, and means for operating said clutch selectively from either side of the table including dual control levers mounted respectively at opposite sides of the table, a shifter rod for said clutch, said shifter rod terminating in a rack and a spiral gear meshing with said rack and operatively connected to said levers for joint control thereby.

30. A machine tool having an elongated bed, a table reciprocably mounted upon the bed, a headstock and tailstock extending upwardly from said bed on opposite sides of the table, and midway of the length of the bed, a rotatable cutter spindle mounted on each stock, means for rotating said spindles including a prime mover, a main drive shaft, branch transmissions extending from the drive shaft to the respective spindles, separate reversers for coupling said branch transmissions to said shaft, means for coupling the shaft to the prime mover including a shiftable clutch member splined on said shaft, means operable upon movement of the clutch in one direction to connect the shaft to the prime mover, means operative upon movement of the clutch in an opposite direction to engage a brake to decelerate the shaft, and dual control means operative from either side of the table and from a position adjacent either stock including a shifter rod operatively connected at one end to the clutch and having rack teeth formed on the other end thereof, a spiral gear meshing with said rack teeth, and means including a crank arm operatively connecting said gear to the dual control levers for oscillation thereby to cause shifting of the clutch.

31. A machine tool having a bed, a table reciprocably mounted upon the bed, upwardly extending columns attached to opposite sides of the bed, said columns having guideways formed on respective faces thereof, a cross rail mounted on said guideways, said cross rail having a drive bracket attached to one end thereof, a spindle carrier reciprocably mounted upon the rail having a spindle journaled therein, power means for rotating said spindle including a drive shaft extending from said bracket to the carrier, a power driven shaft extending upwardly from the bed into said drive bracket, means in the drive bracket for coupling the drive shaft to said power driven shaft for rotation thereby in opposite directions or for complete disconnection therefrom, and a control lever mounted exteriorly of the drive bracket for actuating said control means.

32. A machine tool having a bed, a table reciprocably mounted upon the bed, a column extending upwardly from one side of the table, a spindle carrier reciprocably mounted upon the column for adjustment toward and from the table, a cutter spindle journaled in the carrier, means to rotate said spindle at various speeds including a prime mover mounted in the bed, a drive shaft extending upwardly from the bed into the carrier, a reverser in the bed for coupling said drive for actuation by the prime mover in opposite directions, a speed change box mounted in the carrier including a plurality of shiftable gears, a plurality of cams rotatably mounted in said box and operatively connected for shifting said gears, a single control lever rotatably mounted upon the exterior of the carrier and operatively connected for individual or joint operation of said cams to effect a successive series of spindle speeds and a shiftable dial concentric with the axis of said lever for indicating the rate of spindle rotation for the successive circumferential positions of the control lever.

33. A milling machine having a bed, a table reciprocably mounted upon the bed, a column adjacent one side of the table, a spindle carrier supported by the column for movement relative to the table, a power transmission mounted in the bed for effecting translation of the carrier including a reverser clutch and a rate determining clutch, a first shifter rod extending from the carrier to the reverser clutch, a second shifter rod extending from the carrier to the rate determining clutch, a remote control lever mounted on the carrier for joint actuation, a trip plunger mounted in the carrier in operative engagement with the first named shifter rod and dogs carried by the column for tripping said plunger to a neutral position upon movement thereof to either position by said remote control lever.

34. A machine tool having a fixed member, a movable member mounted thereon for translation relative to the first named member, power operable and manually operable means for effecting said translation, means to counterbalance said movable member during movement thereof including a cylinder, a source of pressure, a main delivery line for said source of pressure, a pair of control valves arranged in series in said line, branch lines extending from each control valve to the counterbalancing cylinder, a lever for controlling said power operable means coupled to one of said valves, a second lever for controlling said manualy operable means coupled to the other of said valves, said main delivery line normally having a relatively low pressure, and means operable upon movement of either of said valves by their respective control levers to cause a sudden increase of pressure when connected to the counterbalancing cylinder.

35. A machine tool having a worktable, a column, a tool carrier movable on the column toward and from the table, means to clamp the carrier to the column including a pair of cams rotatable in opposite directions to effect clamping, a floating cylinder and piston interposed between the cams and respectively connected thereto, a pump mounted in the carrier, a fluid reservoir formed in the carrier, power operable means for rotating said pump, valve means for coupling the pump to said cylinder, and a control lever mounted on the carrier and operatively connected to the valve for determining actuation of the clamping means.

36. A machine tool having a bed, a table reciprocably mounted upon the bed, a headstock member and a tailstock member mounted at opposite sides of the table, a cross rail reciprocably mounted upon said stocks for movement toward and from the table, a spindle carrier mounted on the cross rail having a cutter spindle journaled therein, means for rotating said spindle and power adjusting said cross rail including a prime mover, a first train extending to the spindle including a reverser and a speed change mechanism in serial relation, a clutch for coupling said train to the prime mover, a second train driven by the prime mover exclusive of said clutch, an elevating screw journaled in the rail and a reverser for coupling the last named train to said screw for effecting rotation thereof in opposite directions, said reverser also being operable for disconnecting the train from said screw for stopping movement of the rail.

37. A machine tool having a bed, a table reciprocably mounted upon the bed, a headstock member and a tailstock member mounted at opposite sides of the table, a cross rail reciprocably mounted upon said stocks for movement toward and from the table, a spindle carrier mounted on the cross rail having a cutter spindle journaled therein, means for rotating said spindle and power adjusting said cross rail including a prime mover, a first train extending to the spindle including a reverser and a speed change mechanism in serial relation, a clutch for coupling said train to the prime mover, a second train driven by the prime mover exclusive of said clutch, an elevating screw journaled in the rail, a reverser for coupling the last named train to said screw for effecting rotation thereof in opposite directions, said reverser also being operable for disconnecting the train from said screw for stopping movement of the rail, a third train continuously driven by the second named train for effecting translation of the carrier along said cross rail, and a control lever mounted on the end of said rail for connecting said last named train to the carrier for actuation thereby.

38. A machine tool having a bed, a table reciprocably mounted upon the bed, a headstock member and a tailstock member mounted at opposite sides of the table, a cross rail reciprocably mounted upon said stocks for movement toward and from the table, a spindle carrier mounted on the cross rail having a cutter spindle journaled therein, means for rotating said spindle and power adjusting said cross rail including a prime mover, a first train extending to the spindle including a reverser and a speed change mechanism in serial relation, a clutch for coupling said train to the prime mover, a second train driven by the prime mover exclusive of said clutch, an elevating screw journaled in the rail, a reverser for coupling the last named train to said screw for effecting rotation thereof in opposite directions, said reverser also being operable for disconnecting the train from said screw for stopping movement of the rail, a third train continuously driven by the second named train for effecting translation of the carrier along said cross rail, a control lever mounted on the end of said rail for connecting said last named train to the carrier for actuation thereby, and a reversing mechanism in the third train for changing the direction of movement of the carrier along the rail.

39. A machine tool having a bed, a table reciprocably mounted upon the bed, a headstock member and a tailstock member mounted at opposite sides of the table, a cross rail reciprocably mounted upon said stocks for movement toward and from the table, a spindle carrier mounted on the cross rail having a cutter spindle journaled therein, means for rotating said spindle and power adjusting said cross rail including a prime mover, a first train extending to the spindle including a reverser and a speed change mechanism in serial relation, a clutch for coupling said train to the prime mover, a second train driven by the prime mover exclusive of said clutch, an elevating screw journaled in the rail, a reverser for coupling the last named train to said screw for effecting rotation thereof in opposite directions, said reverser also being operable for disconnecting the train from said screw for stopping movement of the rail, a third train continuously driven by the second named train for effecting translation of the carrier along said cross rail, a control lever mounted on the end of said rail for connecting said last named train to the carrier for actuation thereby, a reversing mechanism in the third train for changing the direction of movement of the carrier along the rail, a feed change box continuously operated by the prime mover, a feed train extending from said box to said carrier, and means operable by said control lever upon movement to disconnect said third train to connect said feed train to the carrier for actuation thereby.

40. A machine tool having a bed, a table reciprocably mounted upon the bed, a cross rail support above the table for adjustment relative thereto, means to effect said adjustment including an elevating screw journaled in the rail, a prime mover, a train extending from the prime mover to said screw and including a reverser, a spindle carrier supported on said rail for movement transversely to the direction of table movement, a cutter spindle, an adjustable quill for supporting said spindle in the carrier for axial movement, power operable means for effecting adjustment of the quill including a second train driven by said first train and exclusive of said reverser, a third train for effecting rotation of the spindle including a reverser and a speed change mechanism in serial power transmitting relationship, and a clutch for selectively connecting said spindle to the prime mover.

41. A machine tool having a bed, a table reciprocably mounted upon the bed, a cross rail supported above the table for adjustment relative thereto, means to effect said adjustment including an elevating screw journaled in the rail, a prime mover, a train extending from the prime mover to said screw and including a reverser, a spindle carrier supported on said rail for movement transversely to the direction of table movement, a cutter spindle, an adjustable quill for supporting said spindle in the carrier for axial movement, power operable means for effecting adjusting of the quill including a second train driven by said first train and exclusive of said reverser, a third train for effecting rotation of the spindle including a reverser and a speed change mechanism in serial power transmitting relationship, a clutch for selectively connecting said spindle to the prime mover, a screw for effecting translation of the carrier along said rail, and a reverser for coupling said second train to said screw and manually operable means for shifting said reverser.

42. A machine tool having a bed, a table reciprocably mounted upon the bed, a cross rail supported above the table for adjustment relative thereto, means to effect said adjustment including an elevating screw journaled in the rail, a prime mover, a train extending from the prime mover to said screw and including a reverser, a spindle carrier supported on said rail for movement transversely to the direction of table movement, a cutter spindle, an adjustable quill for supporting said spindle in the carrier for axial movement, power operable means for effecting adjustment of the quill including a second train driven by said first train and exclusive of said reverser, a third train for effecting rotation of the spindle including a reverser and a speed change mechanism in serial power transmitting relationship, a clutch for selectively connecting said spindle to the prime mover, a screw for effecting translation of the carrier along said rail, a reverser for coupling said second train to said screw, manually operable means for shifting said reverser, a variable feed transmission continuously driven by the prime mover, and individual means for selectively coupling said feed transmission to the carrier translating screw or to the quill to effect relatively slow feeding movements thereof.

43. A machine tool having a reciprocating table, a cross rail, means for supporting said rail above the table for movement toward and from the table, a spindle carrier mounted on the rail, a quill axially adjustable in the carrier, a cutter spindle journaled in the quill, power operable means for actuating said elements including a prime mover, a first train including a reverser coupled to the prime mover for effecting movement of the rail, a second train driven by the first train at a relatively fast rate, a third train, a feed box connecting the third train to the prime mover for actuation thereby at a plurality of relatively slow rates, a common drive shaft for moving the quill and carrier, a feed-rapid traverse clutch for connecting the second train or the third train for actuation of said shaft at a relatively fast rate or at a slow feeding rate, and individual reversers for coupling said shaft to said quill and carrier respectively.

44. A machine tool having a reciprocating table, a pair of spindle carriers associated with said table, means for effecting translation of said carriers including a prime mover, a first and a second train driven by the prime mover at relatively fast rates, a feed train including a rate change mechanism driven by the prime mover, a first clutch for selectively connecting the first train of the feed train to one of said carriers, a second clutch for selectively connecting the second train or the feed train with the other carrier, and individual reversers between each of said clutches and the respective carriers for changing the direction of movement thereof.

MILLARD ROMAINE.
WALTER D. ARCHEA.